(12) United States Patent
Kim

(10) Patent No.: US 8,198,758 B2
(45) Date of Patent: Jun. 12, 2012

(54) STANDBY POWER CUT-OFF DEVICE AND CONTROL METHOD FOR THE SAME

(76) Inventor: Chang-Ho Kim, Seoul (KR)

( * ) Notice: Subject to any disclaimer, the term of this patent is extended or adjusted under 35 U.S.C. 154(b) by 247 days.

(21) Appl. No.: 12/760,693

(22) Filed: Apr. 15, 2010

(65) Prior Publication Data

US 2010/0226060 A1    Sep. 9, 2010

Related U.S. Application Data

(63) Continuation of application No. PCT/KR2010/001388, filed on Mar. 5, 2010.

(30) Foreign Application Priority Data

Mar. 5, 2009 (KR) .......................... 10-2009-0018704
Apr. 28, 2009 (KR) .......................... 10-2009-0037117
Aug. 5, 2009 (KR) .......................... 10-2009-0072016

(51) Int. Cl.
*H01H 9/54* (2006.01)

(52) U.S. Cl. ........................................ 307/140
(58) Field of Classification Search ................... 307/140
See application file for complete search history.

(56) References Cited

FOREIGN PATENT DOCUMENTS
KR    2004-20344    3/2004
KR    2006-42781    11/2004

*Primary Examiner* — Robert L. Deberadinis
(74) *Attorney, Agent, or Firm* — Cha & Reiter, LLC

(57) ABSTRACT

Provided are a standby power cut-off device for automatically cutting off standby power according to power-on/off of an electronic product and a control method for the standby power cut-off device. By providing an electronic product to which the standby power cut-off device and the control method therefor are applied, the present invention can efficiently cut off standby power by using an existing general outlet without a need to use an outlet having a separate function added thereto. Moreover, the present invention automatically cuts off the standby power according to power-off of the electronic product without unplugging the electronic product, thereby maximizing user's convenience.

21 Claims, 18 Drawing Sheets

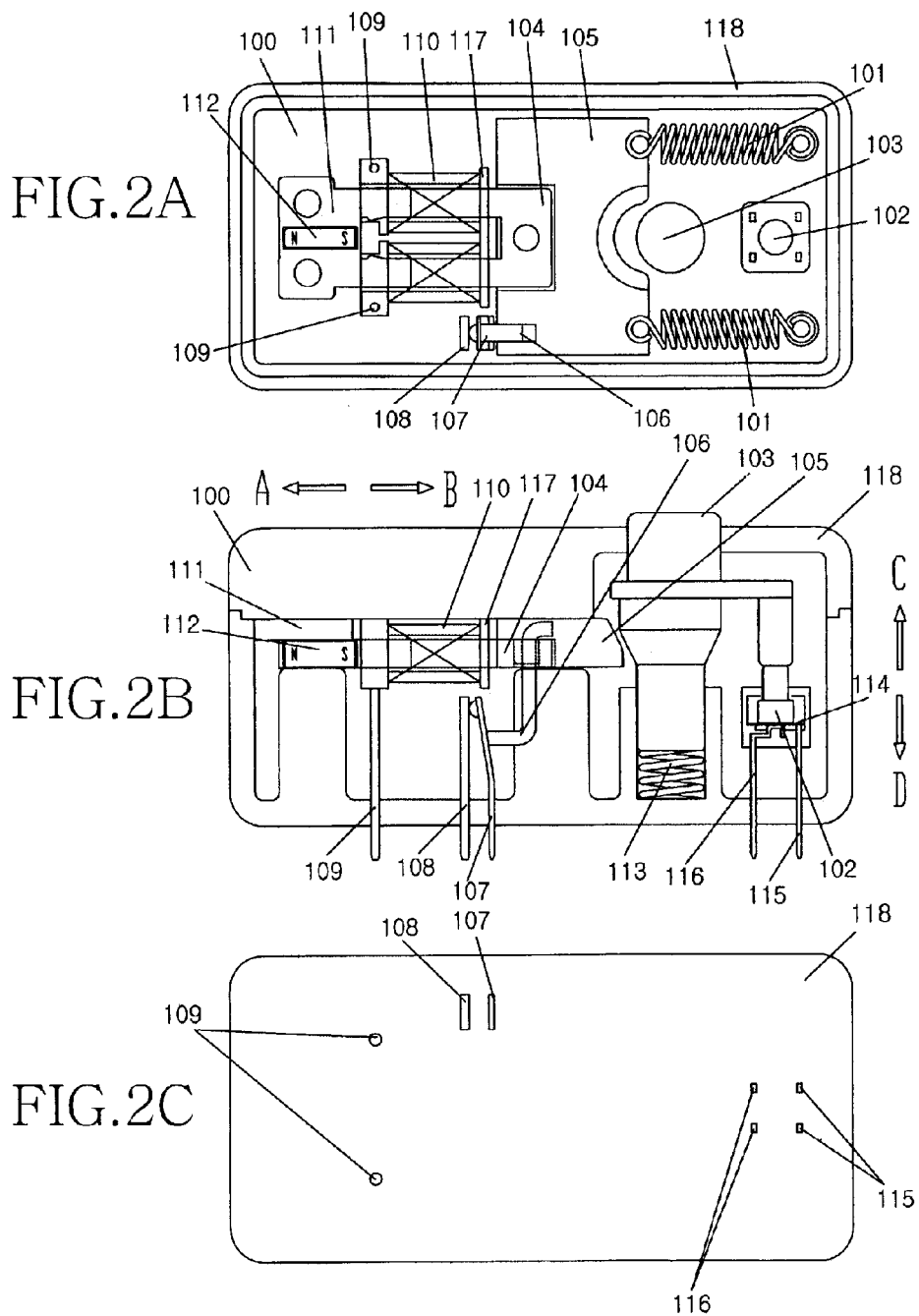

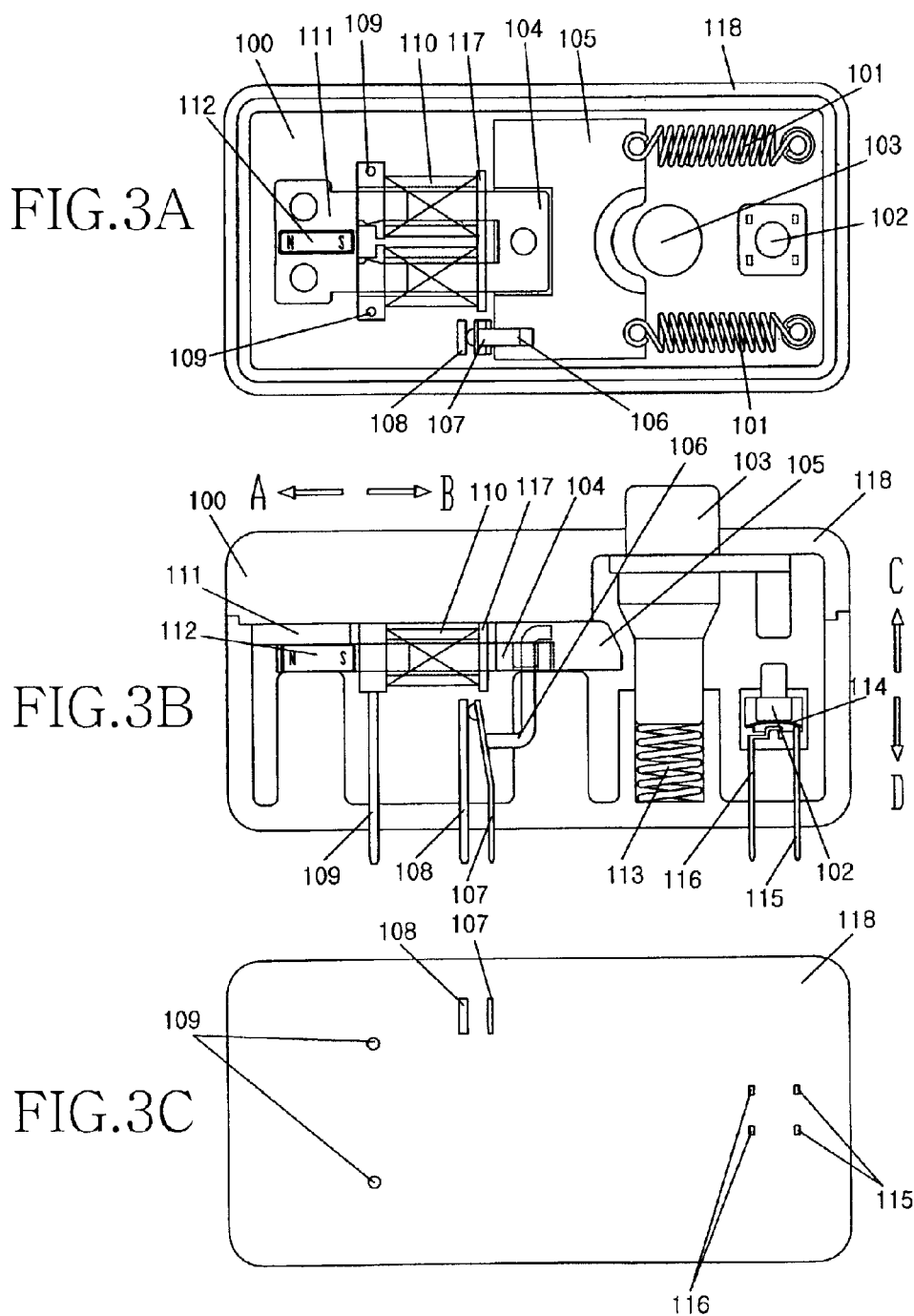

STANDBY POWER CUT-OFF DEVICE AND CONTROL METHOD FOR THE SAME

CROSS REFERENCE TO RELATED APPLICATION

The present application is a continuation of international application PCT/KR2010/001388 filed on Mar. 5, 2010, which in turn claims a priority to Korean Patent Application 10-2009-0018704 filed on Mar. 5, 2009, Korean Patent Application 10-2009-0037117 filed on Apr. 28, 2009 and Korean Patent Application 10-2009-0072016 filed on Aug. 5, 2009.

BACKGROUND OF THE INVENTION

1. Field of the Invention

The present invention relates to a standby power cut-off device and a control method for the same, and more particularly, to a standby power cut-off device installed in an electronic product to automatically cut off standby power and a control method for the standby power cut-off device.

2. Description of the Related Art

As electronic products using semiconductors are increasing along with the development of the electronic industry, predetermined standby power is consumed even when the power of an electronic product is cut off. As a result, 11% to 15% of the total power consumed in homes and companies is wasted by the standby power. Statistics show that power loss amounting to several hundreds of billions won per year occurs due to the standby power.

By reducing the standby power, energy can be saved and $CO_2$ emission caused by power generation can be reduced, thereby delaying environmental pollution and global warming. Consequently, various countries of the world have established standby power standards for reducing standby power and have exerted much effort to develop techniques for reducing standby power in cooperation with the industry.

As an approach to reduce standby power, a switch has been installed in a multi-outlet for power on/off. However, this approach has outlived its utility because of inconvenience in use in a power-off state. Korean Patent Publication Nos. 10-2004-0020344 and 10-2006-0042781 disclose methods for cutting off power by measuring standby current. The standby power cut-off methods for a computer disclosed in the aforementioned publications cut off standby current power by measuring standby current flowing in the computer, but another standby power is generated in a circuit necessary for control. Moreover, standby power varies from electronic product to electronic product, making it difficult to discriminately control the standby power. Furthermore, an electronic product having a remote control receiver consumes additional standby power for reception.

Accordingly, there is an urgent need for a standby power cut-off device and method for solving the foregoing problems.

SUMMARY OF THE INVENTION

An aspect of the present invention is to address at least the above problems and/or disadvantages and to provide at least the advantages described below. Accordingly, an aspect of the present invention is to provide a standby power cut-off device which is driven in an electronic product to efficiently cut off standby power, and a control method for the standby power cut-off device.

Moreover, another aspect of the present invention is to provide a standby power cut-off device which cuts off standby power according to the power-on/off of an electronic product, and a control method for the standby power cut-off device.

According to an aspect of the present invention, there is provided a standby power cut-off device, including a striker that is movable toward a side as a knob switch for powering on or off an electronic product is pressed, a striker contact fixed at a side of the striker to cause a contact point and another contact point of a power cable going to a power supply device of the electronic product to contact or be separated from each other, a core spaced apart from the striker by a predetermined interval, the core comprising a magnet for maintaining contact between the contact point and the another contact point by attracting the striker, which moves toward the side upon pressing of the knob switch, by a magnetic force thereof, and a solenoid for cause the contact point and the another contact point to contact or be separated from each other by generating a repulsive force with respect to the magnetic force if the electronic product is powered off.

According to another aspect of the present invention, there is provided a standby power cut-off method for an electronic product driven by software, the standby power cut-off method including receiving a power-off signal by using the software, determining whether data storing has been finished prior to power-off of the electronic product, determining a contact point of a tack switch for controlling the power is in an open state if the data storing has been finished, and supplying current to a solenoid to cause a contact point and another contact point of a power cable going to a power supply device for supplying the standby power to contact or be separated from each other, if the tack switch is in the open state.

According to still another aspect of the present invention, there is provided a standby power cut-off method for an electronic product driven by a remote controller, the standby power cut-off method including receiving a power-off signal by using the remote controller, determining a power-off mode as a standby mode or a standby power cut-off mode according to an input scheme using the remote controller, determining whether a contact point of a tack switch for controlling power of the electronic product is in an open state if the mode is determined as the standby cut-off mode, and supplying current to a solenoid to cause a contact point and another contact point of a power cable going to a power supply device for supplying the standby power to contact or be separated from each other, if the contact point of the tack switch is in the open state.

BRIEF DESCRIPTION OF THE DRAWINGS

The above and other features and advantages of exemplary embodiments of the present invention will be more apparent from the following detailed description taken in conjunction with the accompanying drawings, in which:

FIGS. 2A-C illustrate a standby power cut-off switch when an electronic product is powered on according to an embodiment of the present invention;

FIGS. 3A-C illustrate a standby power cut-off switch when an electronic product is in a power-on state according to an embodiment of the present invention;

DETAILED DESCRIPTION OF THE EXEMPLARY EMBODIMENTS

In the following description of the present invention, a detailed description of known functions and configurations incorporated herein is omitted to avoid making the subject matter of the present invention unclear. Terms hereunder are defined on the basis of the function in the present invention, and may vary in accordance with users' or operators' intention, usual practices, and so on. Therefore, the definition of the terms should be made based on the whole contents of the specification.

The present invention proposes a standby power cut-off device, which is applicable to an electronic product, and a control method for the standby power cut-off device. Hereinafter, exemplary embodiments of the present invention will be described in detail with reference to the accompanying drawings. When the electronic product is powered on or off, the standby power cut-off device operates as below.

Figure 1A:
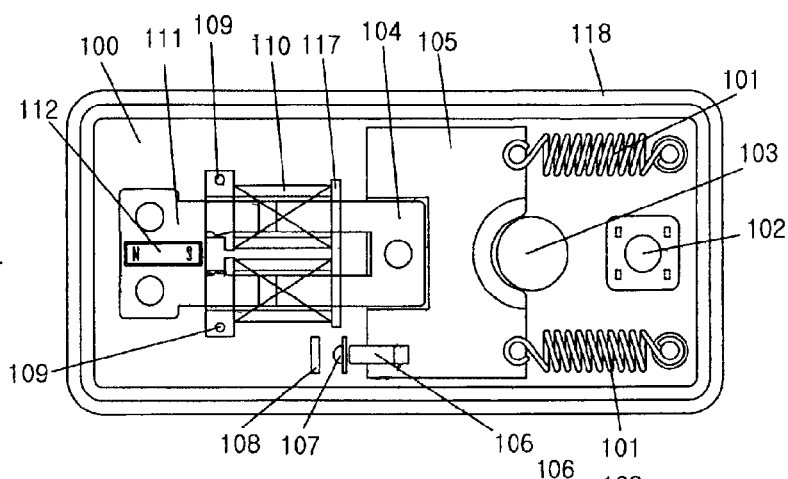
FIGS. 1A-C illustrate a standby power cut-off switch when an electronic product is in a power-off state according to an embodiment of the present invention.
Figure 1B:
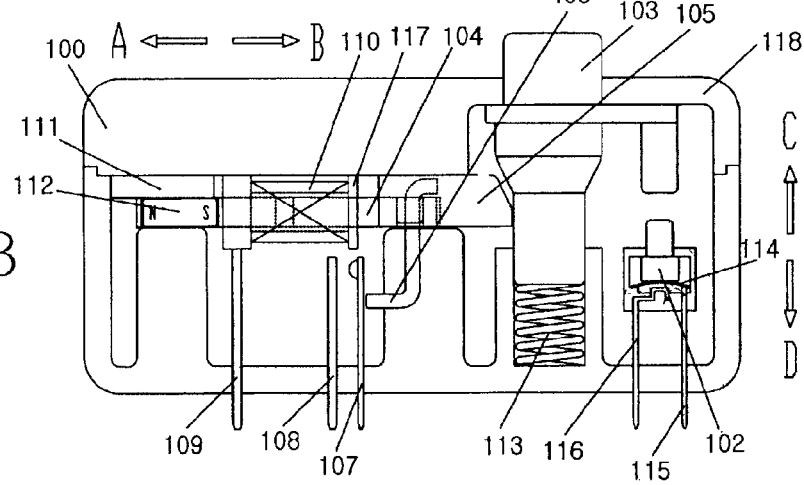
Figure 1C:
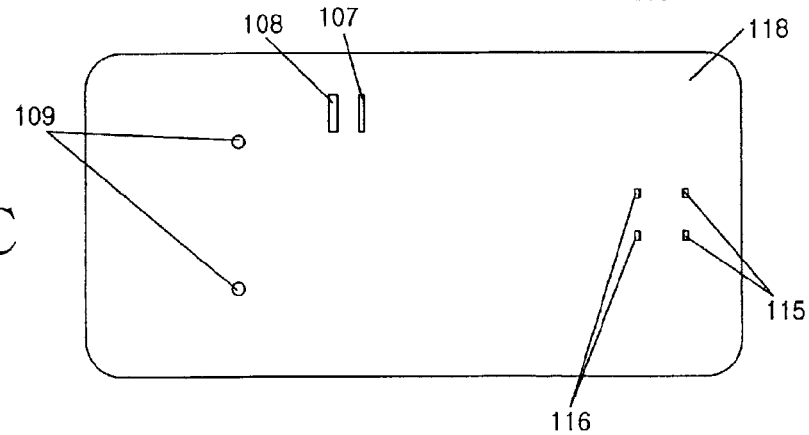

FIG. 1 is a diagram illustrating a switch used in the standby power cut-off device when the electronic product is in a power-off state according to an embodiment of the present invention. More specifically, FIG. 1 shows cross-sections of a standby power cut-off switch viewed from top, left/right, and bottom.

Referring to FIG. 1, a standby power cut-off switch 100 includes striker springs 101, a tack knob 102, a knob (or knob switch) 103, a striker 104, a striker holder 105, striker contacts 106 and 120 (not shown), a first contact point 107, a second contact point 108, a third contact point 121 (not shown), a fourth contact point 122 (not shown), a solenoid coil terminal 109, a solenoid 110, a core 111, a magnet 112, a knob spring 113, a leaf spring 114, a first tack switch contact point 115, a second tack switch contact point 116, a bobbin 117, and a case 118. The striker 104 and the striker holder 105 may be formed integrally into one piece which may be referred to as a "striker" for short.

The standby power cut-off switch 100 may be installed in the electronic product. More preferably, the standby power cut-off switch 100 may be installed in power cables going to a power supply device and a power switch portion in the electronic product. By installing the standby power cut-off switch 100 in those positions, it is possible to fundamentally prevent the power supply device from generating standby power in the power-off state of the electronic product. When the electronic product is in the power-off state, in the standby power cut-off switch 100, the first contact point 107 and the second contact point 108 are not in contact with each other, and the third contact point 121 and the fourth contact point 122 are not in contact with each other. This means that two power cables going to the power supply device are opened to prevent power from being supplied to the power supply device.

FIG. 2 is a diagram illustrating the standby power cut-off switch 100 when the electronic product is powered on according to an embodiment of the present invention, and FIG. 3 is a diagram illustrating the standby power cut-off switch 100 when the electronic product is in a power-on state according to an embodiment of the present invention. More specifically, FIGS. 2 and 3 show cross-sections of the standby power cut-off switch 100 viewed from top, left/right, and bottom.

Referring to FIGS. 2 and 3, if the knob 103 of the standby power cut-off switch 100 is pressed to supply or cut off power to the electronic product, the knob 103 pushes the striker holder 105. The striker holder 105 and the striker 104 may be formed integrally into one piece which will be referred to as a "striker" for short. The striker holder 105 may also be formed integrally into one piece with the striker contacts 106 and 120 (not shown).

If the knob 103 is pressed in a direction D, the striker holder 105 is pushed in a direction A, such that the striker 104 made of steel moves towards a side. The striker 104 having moved is attracted in the direction A in which a magnetic force of the core 111 including the magnet 112 acts, and sticks to the core 111. In this state, the striker contact 106 formed integrally with the striker 104 pushes the first contact point 107 to urge the first contact point 107 to contact the second contact point 108 fixed to the case 118. Another striker contact 120 formed integrally with the striker 104 pushes the third contact 121 to urge the third contact point 121 to contact the fourth contact point 122 fixed to the case 118. At this time, the striker springs 101 for pulling the striker holder 105 are also elongated in the direction A.

Once the knob 103 is pressed, the tack knob 102 is also pressed. As the tack knob 102 is pressed, the leaf spring 114 is also pressed such that the first tack switch contact point 115 and the second tack switch contact point 116 provided below the leaf spring 114 come into contact with each other.

If a force applied to the knob 103 is removed, the knob spring 113 provided below the knob 103 is restored in a direction C, but the striker 104 still remains sticking to the core 111 due to the magnetic force. Subsequently, the striker contacts 106 and 120 continue pushing the first contact point 107 and the third contact point 121, keeping the contacts (107/108 and 121/122) in contact with each other. Meanwhile, the tack knob 102 is also restored as the leaf spring 114 is restored in the direction C, keeping the first tack switch contact point 115 and the second tack switch contact point 116 separated from each other.

Thereafter, if the knob 103 is pressed in the direction D to power off the electronic product in the power-on state, the tack knob 102 is also pressed. The leaf spring 114 is pressed by the tack knob 102 such that the first tack switch contact point 115 and the second tack switch contact point 116 come into contact with each other. A control signal (or a power-off signal) is generated by the contact between the contact points (115 and 116), and the control signal is provided to a control circuit, that is, a central processing unit (CPU) or a controller.

Upon receiving the control signal for cutting off the power, the standby power cut-off switch 100 performs operations for cutting off the standby power in the electronic product. The standby power cut-off switch 100 includes the solenoid 110 which is configured by winding a solenoid coil around the bobbin 117 to connect to the solenoid coil terminal 109. The solenoid 110 may be inserted into the core 111. Once current is applied to the solenoid coil, the solenoid 110 becomes an electromagnet, thus generating a second magnetic field and a force for pushing the magnet 112.

As a result, a force of the magnet 112 for attracting the striker 104 becomes weaker than a force of the striker spring 101 for acting in the direction B, so that the striker spring 101 is restored in the direction B. Thus, the striker spring 101 pulls the striker holder 105, and the striker 104 and the striker contacts 106 and 120, which are formed integrally with the striker holder 105, are also restored to their original positions. That is, the standby power cut-off switch 100 is arranged as shown in FIG. 1 such that the first contact point 107 and the second contact point 108 are not in contact with each other, and the third contact point 121 and the fourth contact point 122 are not in contact with each other, thereby cutting off the main power and standby power of the electronic product.

Figure 4:
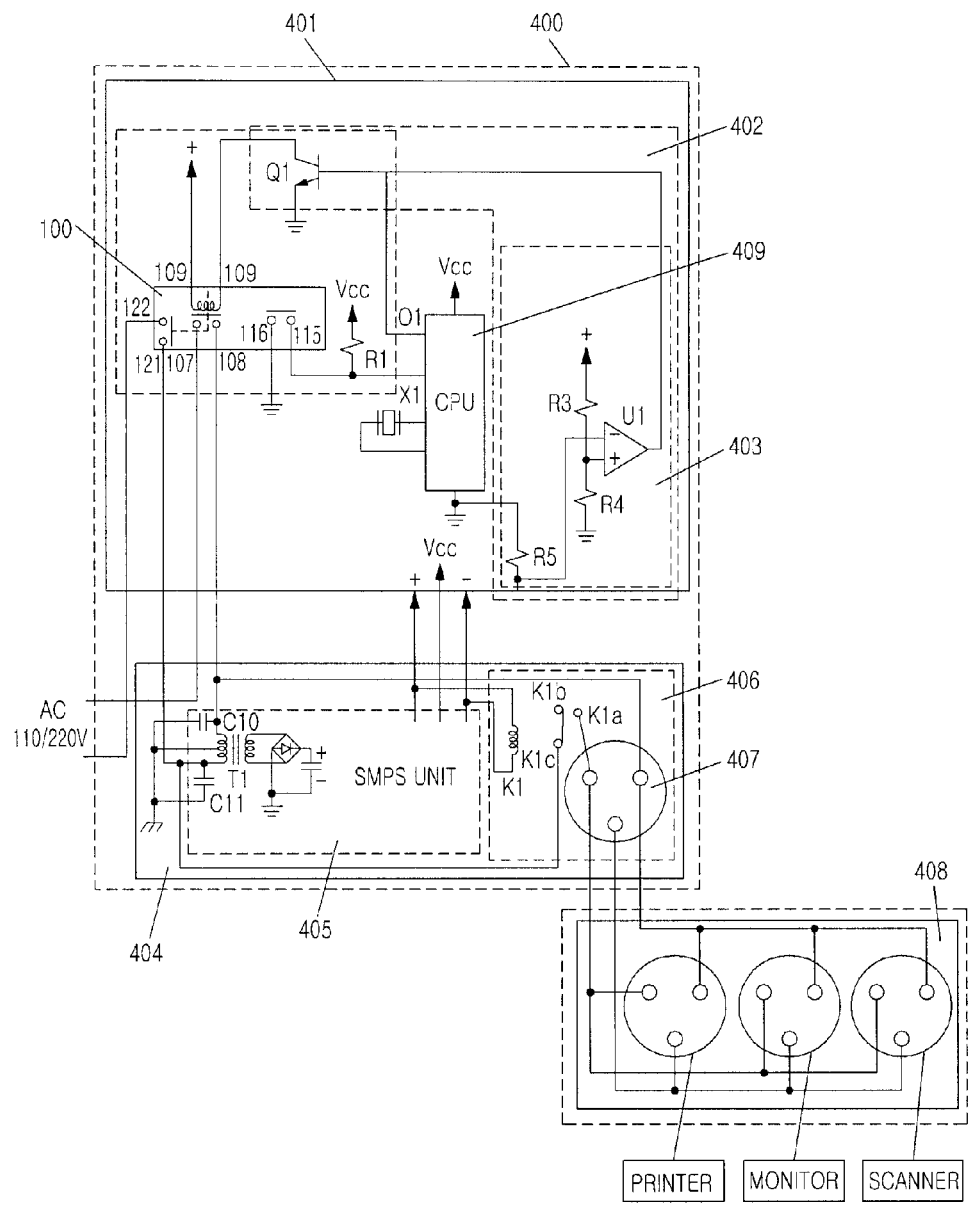
FIG. 4 is a circuit diagram of an electronic product to which a standby power cut-off device is applied according to an embodiment of the present invention.

FIG. 4 is a circuit diagram of an electronic product to which a standby power cut-off device is applied according to an embodiment of the present invention.

Referring to FIG. 4, an electronic product 400 includes a main body 401, a power unit 404, and a multi-tap 408. The main body 401 may include the standby power cut-off switch 100, a controller (or CPU) 409, a current determining drive stage 402, and a standby current determiner 403.

The standby power cut-off switch 100 is preferably installed in a power switch portion of the main body 401. However, it will be obvious to those of ordinary skill in the art that the standby power cut-off switch 100 may also be installed in other positions in the electronic product 400. The power unit 404 may include a switching mode power supply (SMPS) unit 405 and an outlet portion 406. The multi-tap 408 is used to supply the power to peripheral devices. For example, if the electronic product 400 is a computer, the peripheral devices may be a printer, a monitor, a scanner, and so forth. In the following description, operations of the peripheral devices which are not related to the present invention will not be described.

FIG. 4 shows the structure of a circuit for cutting off standby power where the standby power cut-off device is installed in the electronic product 400 such as a television (TV) or a washing machine. Hereinafter, a detailed description will be made of the structure and operation of the circuit.

The standby power cut-off switch 100 may be provided in a predetermined position allowing convenient use in the main body 401 of the electronic product 400. If the knob 103 of the standby power cut-off switch 100 is pressed to power on the electronic product 400, the first contact point 107 and the second contact point 108 come into contact with each other, the third contact point 121 and the fourth contact point 122 come into contact with each other, and alternating current (AC) power is supplied to the power unit 403 of the electronic product 400. Once the AC power is provided to a transformer T1 of the SMPS unit 405 of the power unit 403, the SMPS unit 405 generates direct current (DC) power necessary for the main body 401.

To cut off standby power, power supply may be cut off by installing a contact point in one of power cables going to the SMPS unit 405. However, in an embodiment of the present invention, the standby power is cut off by installing contact points in both of the power cables. By doing so, the standby power can be completely cut off. That is, since line filters C10 and C11 of the SMPS unit 405 are connected to ground, if a contact point is installed in one of the two power cables, leakage current of about several hundreds of μA may flow to ground through a capacitor of the other cable.

The present invention may further include the outlet portion 406 capable of controlling the power of the peripheral devices, in addition to the power unit 404 for supplying power to the main body 401. The outlet portion 406 may be installed inside or outside the power unit 404. Once power is supplied to the electronic product 400, a relay K1 of the outlet portion 406 operates and a relay switch moves from a contact point k1*b* to a contact point k1*a*. In this way; upon application of the power to the main body 401 of the electronic product 400, the power is supplied to an outlet 407 of the outlet portion 406. On the other hand, if the electronic product 400 is powered off, the relay K1 of the outlet portion 406 operates and thus the relay switch returns to the contact point k1*b*. Accordingly, once the electronic product 400 is powered off, the power is not supplied to the outlet 407.

For example, when the peripheral devices such as a printer, a monitor, a scanner, and the like are connected to the outlet 407 and are supplied with power, the main power and standby power of the peripheral devices can be automatically cut off by cutting off the power of the main device, that is, the electronic product 400.

To power off the electronic product 400 which normally operates with power supply, the power-off operation may be performed by using software or a switch. The power-off operation using software involves presetting a power-off function in the electronic product 400 and automatically performing the power-off function. This case may be compared to setting sleep reservation time in a TV and automatically powering off the TV or automatically powering off a washing machine upon completion of washing.

When the electronic product 400 is powered off by using software embedded therein, the electronic product 400 is controlled to consume minimum power in the main body 401 after finishing storing data. To detect flowing standby current, a resistor R5 is serially connected to a power supply line. According to the amount of current flowing in the main body 401, voltages at both ends of the resistor R5 change. To determine whether the current flowing in the main body 401 is standby current based on the change in the both-end voltages of the resistor R5, the standby current determiner 403 including resistors R3 and R4 and a comparator U1 may be provided. If the standby current determiner 403 determines that the flowing current is standby current, the current determining drive stage 402 including a transistor Q1 is configured to cause current to flow in the solenoid coil of the standby power cut-off switch 100.

When the power-off operation is performed by using a switch, upon pressing of a power-off switch (knob switch), the first tack switch contact point 115 and the second tack switch contact point 116 come into contact with each other. At that moment, a control signal (or power-off signal) is generated and is provided to the CPU (or controller) 409 of FIG. 4. That is, when an input I1 of the CPU 409 goes low, the CPU 409 determines that the power-off operation is desired. Thus, after finishing storing data, the CPU 409 may control an output O1 and the transistor Q1 of the current determining drive stage 402 to be commonly connected with each other, so as to drive the solenoid 110.

Meanwhile, if the circuit of the electronic product 400 is not opened, a standby current detecting circuit may be provided to control the standby power cut-off device. Otherwise, if the circuit is opened, the CPU 409 may directly control the standby power cut-off device.

When the power is turned off in two ways as described above, operations for cutting off standby power can be performed as will be described in detail below.

First, in case of the power-off operation using a switch for the electronic product 400, the CPU 409 stores data associated with operations which have been performed so far. Upon finishing storing the data, the CPU 409 generates the output Q1 of a high level and thus the transistor Q1 operates, such that current flows in the solenoid 110 of the standby power cut-off switch 100. The solenoid 110 functions as an electromagnet, thereby producing a repulsive force with respect to the magnet 112. As a result, the striker 104 is separated from the core 111 and returns to its original position. Once the striker 104 goes back to its original position, the striker contacts (106 and 120) formed integrally with the striker 104 are separated from each other such that the first contact point 107 and the second contact point 108 are separated from each other and the third contact point 121 and the fourth contact point 122 are separated from each other. Consequently, the AC power applied from outside is not supplied to the SMPS unit 405 of the power unit 404, thereby completely cutting off the main power and standby power of the electronic product 400. Once the power supply to the power unit 404 is cut off, the relay K1 of the outlet portion 406 operates and thus the relay switch moves from the contact point k1*a* to the contact point k1*b*. As a result, the power of the outlet 407 is also cut off, thereby automatically cutting off the main power and standby power of the peripheral devices.

Meanwhile, in case of the power-off operation using software, upon completion of storing of the data associated with the operations of the electronic product 400, only standby current flows in the main body 401. In this state, current flowing in the resistor R5 is measured by the standby current determiner 403. The standby current determiner 403 measures the flowing current and compares the measured current with a preset threshold value to determine whether the flowing current is standby current. If the standby current determiner 403 determines that the flowing current is standby current, the current determining drive stage 402 turns on the transistor Q1 to cause current to flow in the solenoid 110. The solenoid 110 functions as an electromagnet, generating a repulsive force with respect to the magnet 112, such that the striker 104 becomes separated from the core 111. As a result, the first contact point 107 and the second contact point 108 are separated from each other and the third contact point 121 and the fourth contact point 122 are separated from each other, such that the power supply to the power unit 404 is cut off. Consequently, the AC power applied from outside is not supplied to the SMPS unit 405 of the power unit 404, thereby completely cutting off the main power and standby power of the electronic product 400. Once the power supply to the power unit 404 is cut off, the relay K1 of the outlet portion 406 operates and thus the relay switch moves from the contact point k1*a* to the contact point k1*b*.

As a result, the power of the outlet 407 is also cut off, thereby cutting off the main power and standby power of the peripheral devices. As described above, if the circuit of the electronic product 400 is opened, the electronic product 400 directly controls the standby power cut-off device; whereas if the circuit is not opened, standby current is checked and controlled, thereby efficiently cutting off the standby power.

Figure 5:
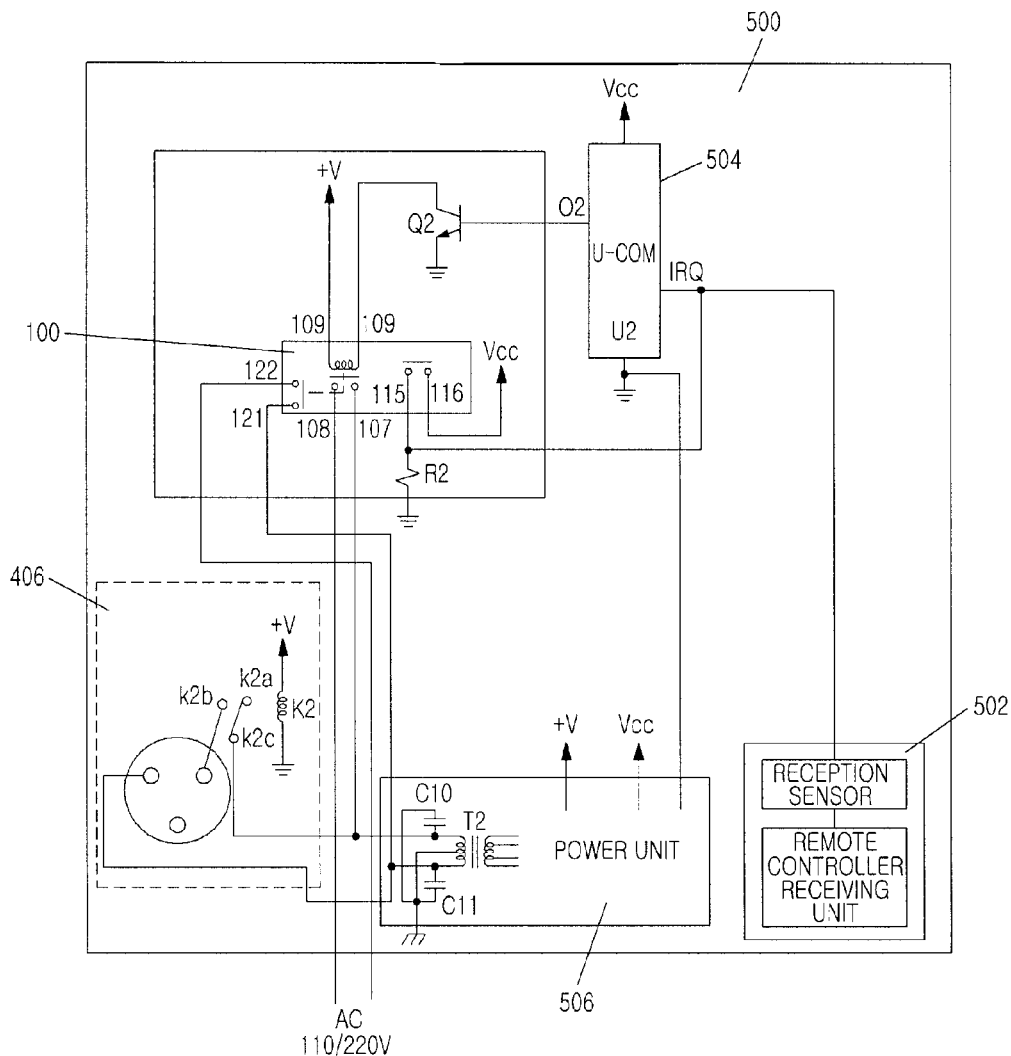
FIG. 5 is a circuit diagram of a standby power cut-off device when an electronic product is powered off by a remote controller according to an embodiment of the present invention.

FIG. 5 is a circuit diagram of a standby power cut-off device for an electronic product driven by a remote controller according to an embodiment of the present invention.

Referring to FIG. 5, an electronic product 500, such as a TV, a home theater, an air conditioner, a hot-air furnace, or the like, which is controlled by the standby power cut-off switch 100 and a remote controller, according to an embodiment of the present invention includes a power unit 506 of the electronic product 500, a remote control receiver 502, an outlet portion 406, and a controller (or CPU) 504. In the following description, the controller 504 is assumed to be a Micom (microcomputer) U2 504. Also in the following description, operations of components which are irrelevant to the present invention will not be described.

A description will now be made of an embodiment of the present invention on the assumption that the electronic product 500 is powered on by using a switch and is powered off by using a remote controller.

The standby power cut-off switch 100 is preferably installed in a power switch portion of the electronic product 500. For example, the standby power cut-off switch 100 may be positioned in front of the electronic product 500 for convenient use. The electronic product 500 is powered on by a switch, whereby the first contact point 107 and the second contact point 108 come into contact with each other and the third contact point 121 and the fourth contact point 122 come into contact with each other, thus supplying AC power to the power unit 506. The power unit 506 transforms the AC power into DC power through a transformer T2 to supply the DC power necessary for the main body of the electronic product 500.

Once the power is supplied to the power unit 506, a relay K2 operates to control the power of peripheral devices. That is, a relay switch of the outlet portion 406 moves from a contact point k2*a* to a contact point k2*b*, such that the power is supplied to the outlet 407. The power of the peripheral devices is controlled through the outlet portion 406.

A standby power cut-off method for an electronic product which does not use a remote controller or an electronic product which can use a remote controller but can also be powered off in other ways (using a switch or software) has already been described above and thus will not be described at this time.

In other words, when an electronic product is powered off by using a switch, the first tack switch contact point 115 and the second tack switch contact point 116 of the standby power cut-off switch 100 come into contact with each other, generating the control signal (or power-off signal). To detect the control signal, an interrupt terminal IRQ of the Micom U2 504 is connected to a side of a resistor R2 of the standby power cut-off switch 100. If an interrupt signal is applied to the interrupt terminal IRQ, the Micom U2 504 generates an output O2 of a high level. The output signal O2 turns on the transistor Q2 to cause current to flow in the solenoid coil of the standby power cut-off switch 100. The solenoid 110 functions as an electromagnet, generating a repulsive force with respect to the magnet 112, such that the striker 104 becomes separated from the core 111 and returns to its original position. Once the striker 104 goes back to its original position, the striker contacts (106 and 120) formed integrally with the striker 104 are separated from each other such that the first contact point 107 and the second contact point 108 are separated from each other and the third contact point 121 and the fourth contact point 122 are separated from each other.

Consequently, the AC power applied from outside is not supplied to an SMPS unit of the power unit 506, thereby cutting off the main power and standby power of the electronic product 500. At this time, the power of the outlet portion 406 is also cut off and thus the power supplied to peripheral devices is also cut off, thereby cutting off the standby power wasted in the peripheral devices.

When a selected course is finished in a washing machine or a microwave oven (in other words, the power is turned off by using software), the output O2 of a high level is generated from the Micom U2 (or CPU) 504. The output signal O2 turns on the transistor Q2 to cause current to flow in the solenoid coil of the standby power cut-off switch 100. The solenoid 110 functions as an electromagnet, generating a repulsive force with respect to the magnet 112, such that the striker 104 becomes separated from the core 111 and returns to its original position. Once the striker 104 goes back to its original position, the striker contacts (106 and 120) formed integrally with the striker 104 are separated from each other, such that the first contact point 107 and the second contact point 108 are separated from each other and the third contact point 121 and the fourth contact point 122 are separated from each other. Consequently, the AC power applied from outside is not supplied to an SMPS unit of the power unit (506), thereby cutting off the main power and standby power of the electronic product 500.

Hereinafter, a description will be made of a standby power cut-off device and method when the electronic product 500 is powered off by using a remote controller. The electronic product 500 driven by the remote controller includes the remote control receiver 502 which includes a remote control receiving unit for receiving a remote control signal and a reception sensor. Upon reception of a power-off signal by the remote control receiving unit, the output O2 of a high level is generated from the Micom U2 504. The output signal O2 turns on the transistor Q2 to cause current to flow in the solenoid coil of the standby power cut-off switch 100. The solenoid 110 functions as an electromagnet, generating a repulsive force with respect to the magnet 112, such that the striker 104 becomes separated from the core 111 and returns to its original position. Once the striker 104 goes back to its original position, the striker contacts (106 and 120) formed integrally with the striker 104 are separated from each other, such that the first contact point 107 and the second contact point 108 are separated from each other and the third contact point 121 and the fourth contact point 122 are separated from each other.

Figure 6:
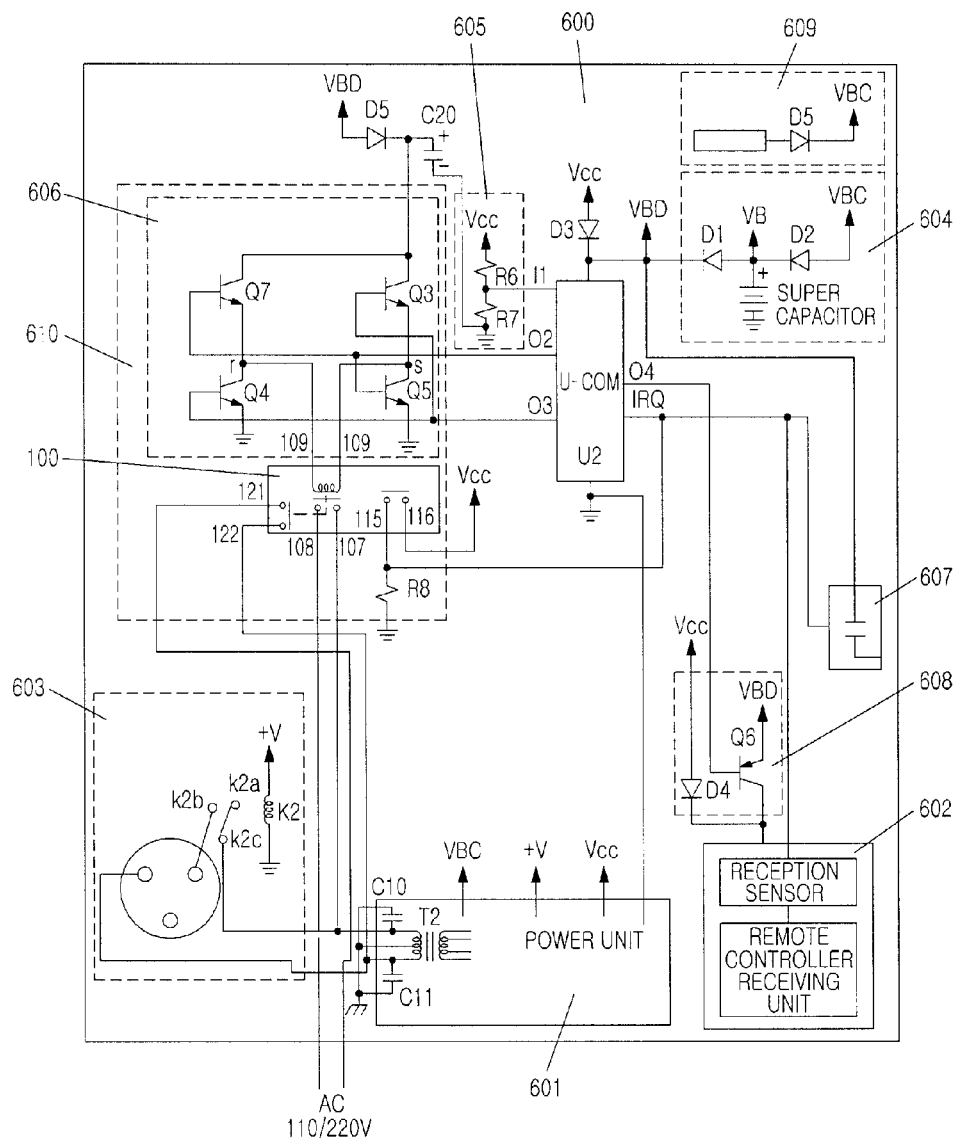
FIG. 6 is a circuit diagram of a standby power cut-off device when an electronic product is powered on by a remote controller according to an embodiment of the present invention.
Figure 7:
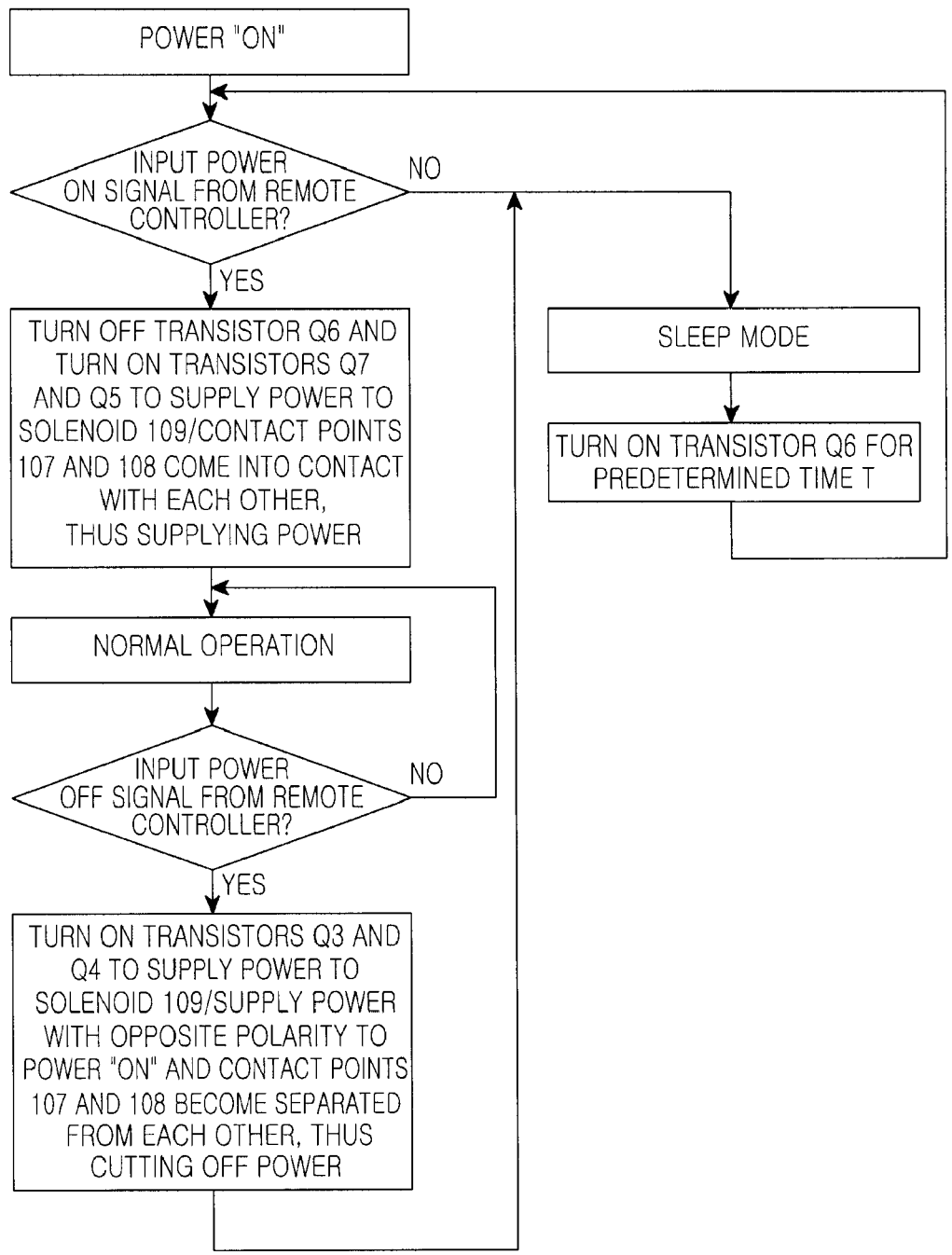
FIG. 7 is a control flowchart for cutting off standby power when an electronic product is powered on by a remote controller according to an embodiment of the present invention.
Figure 8:
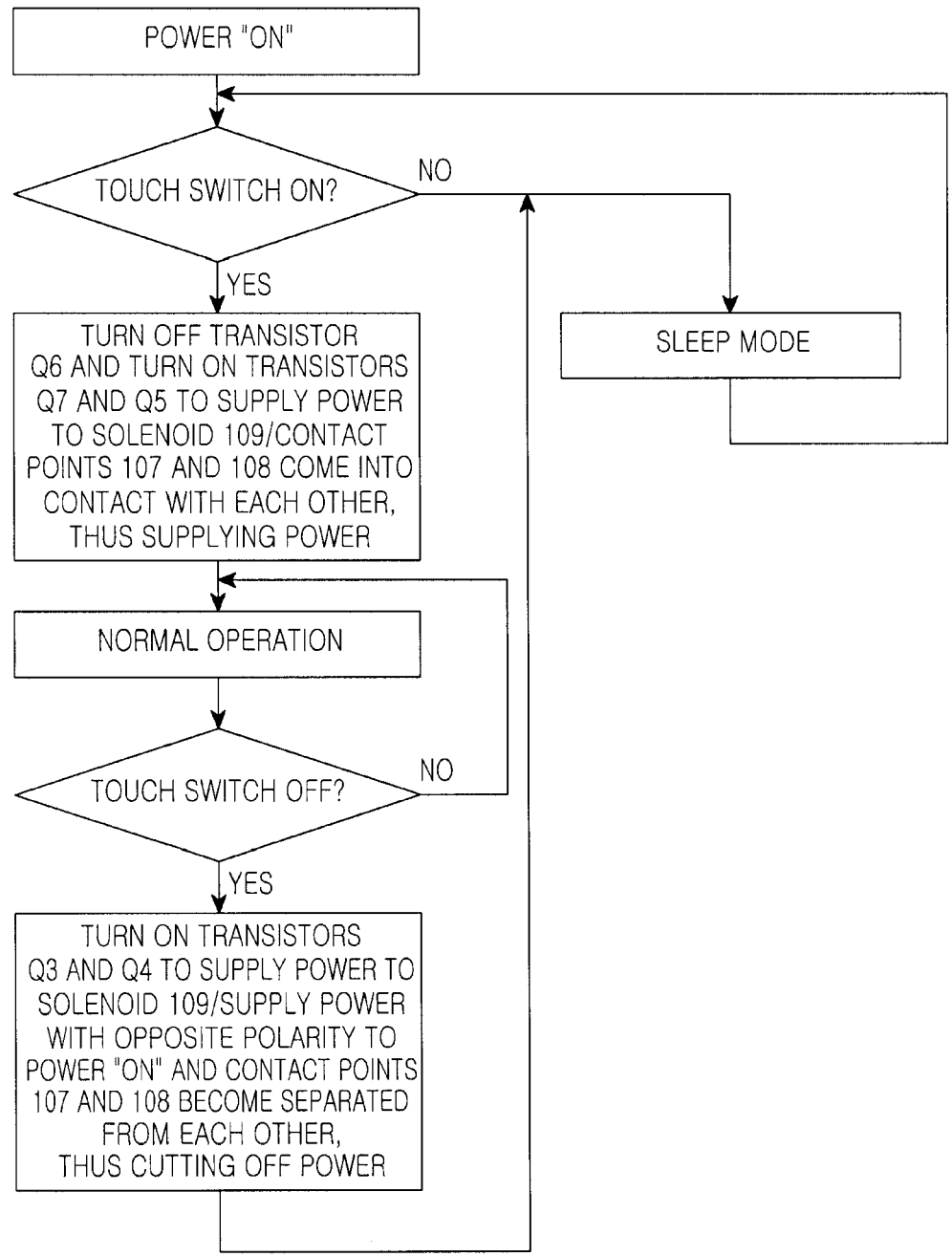
FIG. 8 is a control flowchart for cutting off standby power when an electronic product is powered on by a touch switch according to an embodiment of the present invention.

With reference to FIGS. 6 through 8, a description will now be made of a standby power cut-off device and method when an electronic product is powered on by using a remote controller or a touch switch. In an electronic product driven by a remote controller or a touch switch, AC power coming to the electronic product may be completely cut off to cut off standby power. However, to power on the electronic product again, minimum power is required to drive a remote control receiver or a touch switch.

FIG. 6 is a circuit diagram of a standby power cut-off device when an electronic product is powered on by using a remote controller or a touch switch according to an embodiment of the present invention. FIGS. 7 and 8 are control flowcharts for cutting off standby power according to an embodiment of the present invention.

Referring to FIGS. 6 and 7, an electronic product 600 includes the standby power cut-off switch 100, a power unit 601, a Micom U2, an outlet portion 603, a remote control receiver 602, a power controller 608, a charging power supplier 604, a solar cell charger 609, a state determiner 605, a current drive stage 606, and a touch switch 607.

The remote control receiver 602 includes a reception sensor and a remote control receiving unit and receives a power-on or off signal from a remote controller. The power controller 608 includes a transistor Q6 and a diode D4 to restrict power supply to the remote control receiver 602, so that power consumption of the charging power supplier 604 can be minimized in a power-off state.

The charging power supplier (or charging battery) 604 also includes a charging battery for supplying power to the remote control receiver 602 and diodes D1 and D2 to detect a remote control signal in the power-off state. The charging power supplier 604 supplies power for driving the touch switch 607 in the power-off state. The solar cell charger 609 includes a current non-return diode D5 and a solar cell to charge the charging power supplier 604 with light. The state determiner 605 includes resistors R6 and R7 to determine a normal power state. The current drive stage 606 includes transistors Q3, Q4, Q5, and Q7 to perform a drive operation by changing a polarity in the solenoid coil terminal 109 at the time of power-on or power-off.

In case of the electronic product 600 that can be controlled by a touch switch or a remote controller, the Micom U2 is not awake at all times in the power-off state, and rather, it periodically wakes up. Herein, a state where the Micom U2 is awake is referred to as a wake-up mode and a state where the Micom U2 is not awake is referred to as a sleep mode. In the power-off state of the electronic product 600, the Micom U2 is in the sleep mode to minimize power consumption. This is because when the Micom U2 is in the wake-up mode, the reception sensor of the remote control receiver 602 has to be ready for receiving a signal from the remote controller at all times, thus usually consuming 1.5 mAs. As a result, the power of the charging power supplier 604 is exhausted shortly.

For example, for a 1000 mAH battery, it is entirely discharged after use for 1000/1.5*24=27.8 days. Subsequently, if a user would not use a battery for more than one year, a battery having a capacity larger than 1000 mAH is required. In an embodiment of the present invention, to allow the use of a small-capacity battery, if an output O4 from the Micom U2 is in a low level for only 50 msec during 1 second, the transistor Q6 is turned on for only 50 msec. In this way, the Micom U2 wakes up every 50 msec, and thus the reception sensor senses a signal from the remote controller every 50 msec. The signal transmitted from the remote controller to the reception sensor has to be a signal continuously received for more than 50 msec.

As such, the Micom U2 supplies power to the reception sensor in the sleep mode, thereby prolonging the use time of the battery for supplying power to the remote control receiver 602 by about 20 times. If the power is turned on once within 20 months, the charging battery can be charged.

If the power is supplied to the electronic product 600, the Micom U2 wakes up from the sleep mode and maintains its output O4 in a high level, thereby cutting off the power from the charging battery 604. The Micom U2 also continuously supplies the power to the remote control receiver 602 through the diode D4, so that the reception sensor can sense a signal. Currently used remote controllers usually generate a signal once if a power switch is pressed once. During a power-on operation, since a receiver wakes up every 50 msec, malfunctioning may occur if the timing is not exact. Therefore, by controlling a remote control signal such that a power signal is a signal continuously received for 1 second, control may be possible without causing malfunctioning.

The charging power supplier 604 supplies the power to the Micom U2, the remote control receiver 602, and a condenser for the touch switch 607 through the diode D1 only in the power-off state. Once the normal power is supplied, the power is supplied through the diode D3, and the diode D1 becomes a reverse bias, cutting off power from the charging battery 604. If the normal power is supplied, the charging battery 604 is charged through the diode D2 in an amount equal to an amount of discharge from the charging battery 604. For an electronic product having the solar cell charger 609, the charging battery 604 may be charged by sunlight or electric light.

To determine a normal power state, the resistors R6 and R7 are connected in series to the input I1 of the Micom U2. The Micom U2 may determine that it is the normal power state (power-on state) if the input I1 of the Micom U2 is high, and determines that it is a power-off state if the input I1 of the Micom U2 is low.

Upon reception of a power-on signal from a remote controller or a touch switch, the Micom U2 determines whether the input I1 is high or low. For the low input I1, the output O2 of the Micom U2 is maintained high to turn on transistors Q7 and Q5. A polarity of the solenoid coil terminal 109 of the standby power cut-off switch 100 is "+" at r and "−" at s, so that the solenoid 110 and the magnet 112 can have opposite polarities. Then, a strong gravitational force acts between the solenoid 110 and the magnet 112 and the core 111 including the magnet 112 attracts the striker 104, such that the first contact point 107 and the second contact point 108 come into contact with each other and the third contact point 121 and the fourth contact point 122 come into contact with each other, thereby supplying power.

Upon reception of a power-off signal from the remote controller or the touch switch, an output O3 of the Micom U2 is maintained high for a predetermined time to turn on the transistors Q3 and Q4. The polarity of the solenoid coil terminal 109 of the standby power cut-off switch 100 is "−" at r and "+" at s, so that the solenoid 110 and the magnet 112 can have the same polarity. Then, a repulsive force is generated between the solenoid and the magnet 112, such that the core 111 including the magnet 112 pushes the striker 104, the first contact point 107 and the second contact point 108 are separated from each other, and the third contact point 121 and the fourth contact point 122 are separated from each other, thereby cutting off the power supply.

In an embodiment of the present invention, an electronic product driven by a touch switch, a remote controller, and a knob switch is used as an example. The knob switch is provided together with the touch switch because power supply is possible by pressing the knob 103 of the standby power cut-off switch 100 even when the touch switch is not available due to complete discharge of the charging battery 604.

In case of a power failure during the use of an electronic product, a standby power cut-off method is required. To cut off the standby power during the power failure, the diode D5 and a capacitor C20 are connected to the state determiner 605 and the current drive stage 606. In the following description, the diode D5 and the capacitor C20 will be collectively referred to as a power failure cut-off device. If a power failure occurs, the resistors R6 and R7 go low and the Micom U2 reads the resistor values to control the solenoid to operate and thus the standby power cut-off switch to be opened. The diode D5 prevents a voltage charged in the capacitor C20 from being discharged in case of a power failure, and the capacity of the capacitor C20 is determined to be such that the Micom U2 can determine a power failure and control the solenoid to operate.

FIG. 8 is a control flowchart for cutting off standby power when an electronic product is powered on by a touch switch according to an embodiment of the present invention. Referring to FIG. 8, it can be seen that the above-described standby power cut-off method can be applied in the same manner to not only a case where an electronic product is powered on by a remote controller, but also a case where the electronic product is powered on by a touch switch. That is, if the touch switch consuming about 1 µA in the sleep mode is touched, the interrupt terminal IRQ goes high and the Micom U2 wakes up and performs the aforementioned power-on operation. To detect a power-on signal, the interrupt terminal IRQ of the Micom U2 is connected to the touch switch 607. If an interrupt signal is applied to the interrupt terminal IRQ, the Micom U2 generates the output O2 of a high level.

Hereinafter, a description will be made of a control method for cutting off the standby power of an electronic product including the standby power cut-off device with reference to FIGS. 9 and 10.

Figure 9:
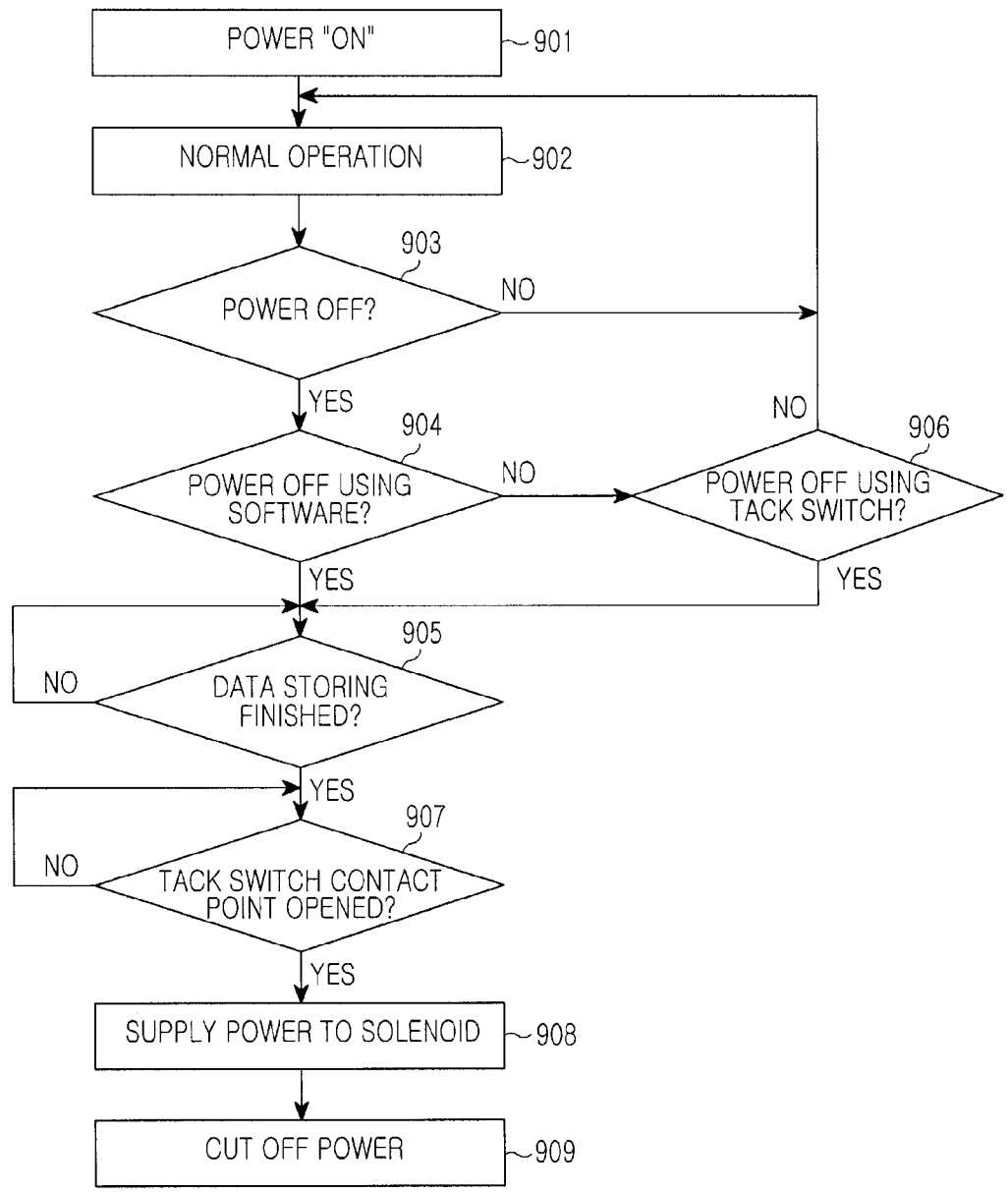
FIG. 9 is a control flowchart for a standby power cut-off device according to an embodiment of the present invention.

FIG. 9 is a control flowchart for the standby power cut-off device according to an embodiment of the present invention. In a current embodiment, a control method for cutting off the standby power of an electronic product driven by software such as an operating system (OS) will be described.

Referring to FIG. 9, the electronic product is powered on in step 901. In step 902, the electronic product performs a normal operation. If the electronic product is powered off in step 903, the process goes to step 904. If the electronic product is powered off by using software in step 904, the process goes to step 905 to store data which has been processed so far. If the electronic product is not powered off by using software in step 904, the process goes to step 906 to determine whether the electronic product is powered off by using a switch such as a knob. That is, it is determined whether a tack switch is powered off through the knob. If so, the process goes to step 905 to finish storing data.

Once storing of the data is finished, the process goes to step 907 to determine whether a tack switch contact point is opened. If current is supplied to the solenoid when the tack switch contact point is closed, power may be supplied again, causing the hunting phenomenon, as long as the knob is pressed in spite of power cut-off Step 907 is intended to prevent such a problem. When the electronic product is powered off by using a switch, it is determined whether storing of data is finished and the tack switch contact point is opened. When the tack switch contact point is opened, the process goes to step 908 to supply current to the solenoid. Upon application of current to the solenoid, the standby power cut-off device operates, thus cutting off the main power and standby power of the electronic product.

Figure 10:
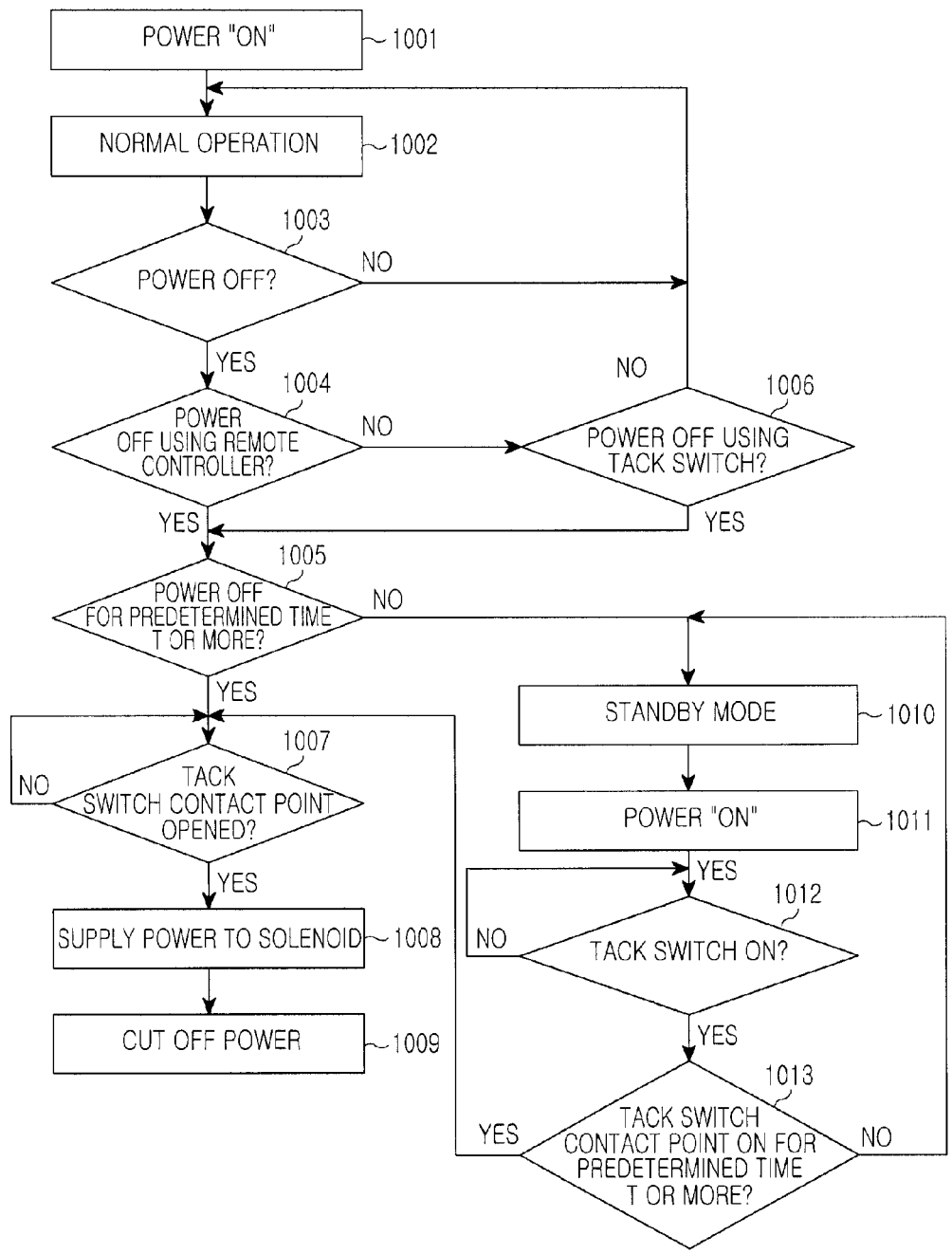
FIG. 10 is a control flowchart for a standby power cut-off device according to another embodiment of the present invention.

FIG. 10 is a control flowchart for cutting off standby power in an electronic product driven by a remote controller according to another embodiment of the present invention.

Referring to FIG. 10, the electronic product is powered on in step 1001. In step 1002, the electronic product performs a normal operation. If the electronic product is powered off in step 1003, the process goes to step 1004. If the electronic product is powered off by using a remote controller in step 1004, it is determined whether a signal received from the remote controller is continuously received for a predetermined time T or more in step 1005.

If the electronic product is not powered off by using the remote controller in step 1004, the process goes to step 1006 to determine whether the electronic product is powered off by using a switch through a knob. In other words, it is determined whether a tack switch is powered off by using the knob. If the tack switch is powered off, the process goes to step 1005 in which it is determined whether a power-off signal is received for the predetermined time T or more to determine a power-off mode.

For example, when the electronic product is powered off by using the remote controller, the power-off mode may include a standby mode where the power of the electronic product such as an air conditioner or a TV is not completely cut off, and the electronic product consumes minimum standby power; and a standby cut-off mode where standby power is completely cut off if the power-off signal is continuously received for the predetermined time T or more. That is, when it is not necessary to use an air conditioner in the heating season, the standby power of the air conditioner is completely cut off by sending the power-off signal for the predetermined time T or more through the remote controller or the power switch; whereas by sending the power-off signal for a time shorter than the predetermined time T, the air conditioner operates in the standby mode. The CPU or controller of the electronic product may receive the power-off signal to determine the power-off mode.

If the power-off signal is input for the predetermined time T or more in step 1005, the process goes to step 1007 where it is determined whether the tack switch contact point is opened. If current is supplied to the solenoid in a closed state of the tack switch contact point, the power is supplied again, causing the hunting phenomenon, as long as the knob is pressed in spite of power cut-off. Step 1007 is intended to prevent such a problem.

When the electronic product is powered off by using the switch, it is determined whether the tack switch contact point is opened. If so, the process goes to step 1008 to supply current to the solenoid. Once the current is supplied to the solenoid in step 1008, the standby power cut-off device operates in step 1009, thus cutting off the main power and standby power of the electronic product. If the power-off signal is input for a time shorter than the predetermined time T in step 1005, the press goes to step 1010 where the electronic product operates in the standby mode. If the electronic product is powered on by using the remote controller or the switch in step 1011, the electronic product performs a normal operation.

In step 1012, it is determined whether the power-off signal is input through the remote controller or the tack switch. In step 1013, it is determined whether the power-off signal is input for the predetermined time T or more through the remote controller or the tack switch. If so, the process goes to 1007; otherwise, the process goes to step 1010. In step 1007 and subsequent steps therefrom, the above-described operations are repeated. Through the foregoing control method, when the electronic product is powered off, the standby power of the electronic product can be effectively cut off.

Hereinafter, a description will be made of a standby power cut-off device according to another embodiment of the present invention.

Figure 11A:
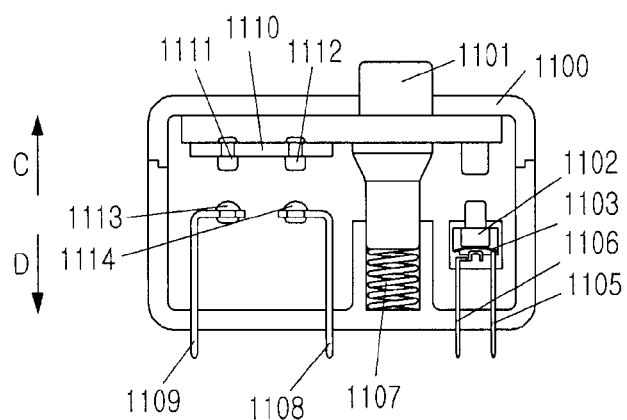
FIGS. 11A, 11B illustrate a standby power cut-off switch according to another embodiment of the present invention.
Figure 11B:
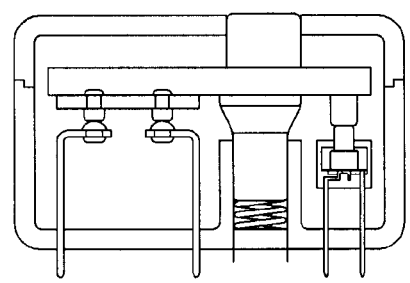

FIG. 11 is a diagram illustrating a standby power cut-off switch according to another embodiment of the present invention. Referring to FIG. 11, a standby power cut-off switch 1100 includes a knob (or knob switch) 1101 to be pressed by a user's hand, and a first contact point 1111 and a second contact point 1112 which are provided on a plate 1110 formed of a conductive material integrally with the knob 1101. The standby power cut-off switch 1100 also includes a third contact point 1113 compressed to a first terminal 1109 and a fourth contact point 1114 compressed to a second terminal 1108. A tack knob 1102 can contact and be separated from a third terminal 1106 and a fourth terminal 1105 by a leaf spring 1103.

The standby power cut-off switch 1000 operates as follows. Once the knob 1101 is pressed by the hand, the first contact point 1111 and the second contact point 1112 of the plate 1110 come into contact with the third contact point 1113 compressed to the first terminal 1109 and the fourth contact point 1114 compressed to the second terminal 1108, respectively, as shown in (b) of FIG. 11. At this time, the first terminal 1109 and the second terminal 1108 are connected to each other. The tack knob 1102, which becomes pressed, pushes the leaf spring 1103, such that the third terminal 1106 and the fourth terminal 1105 are connected and a knob spring 1107 is compressed.

When the knob 1101 is released later, the knob spring 1107 is restored to its original state such that the first terminal 1109 and the second terminal 1108 are opened and the third terminal 1106 and the fourth terminal 1105 are also opened as shown in (a) of FIG. 11.

Figure 12:
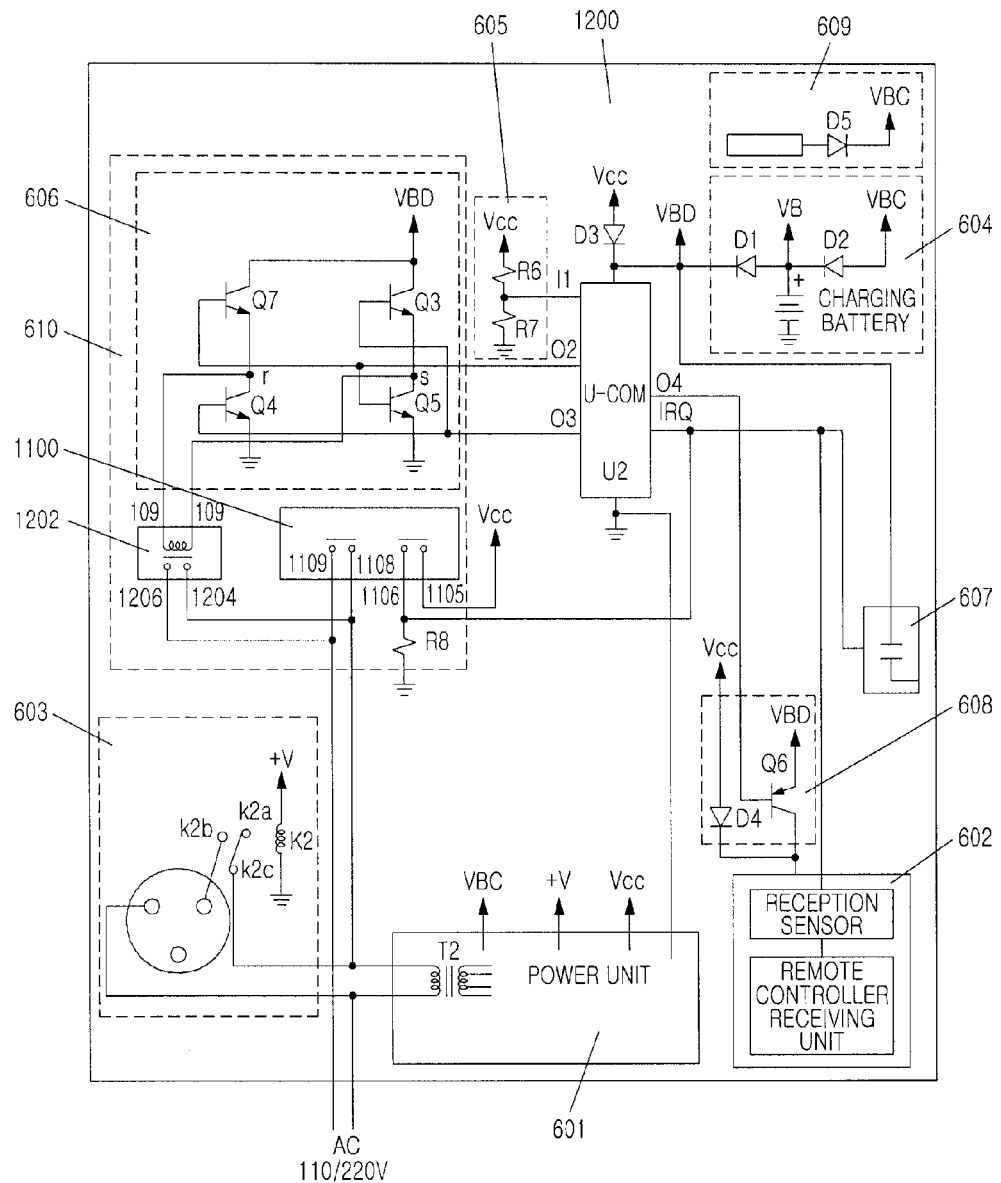
FIG. 12 is a circuit diagram of an electronic product to which a standby power cut-off device is applied according to another embodiment of the present invention.

FIG. 12 is a circuit diagram of an electronic product (1200) to which a standby power cut-off device is applied according to another embodiment of the present invention. Referring to FIG. 12, if a knob (or knob switch) of a standby power cut-off switch 1100 is pressed, contact points of the first terminal 1109 and the second terminal 1108 come into contact with each other, thus supplying AC power to a power unit 601. The power unit 601 transforms the AC power to DC power to supply power necessary for the electronic product. A Micom U2 generates an output O2 of a high level for a predetermined time to turn on a transistor Q7 and a transistor Q5. If current flows from r to s through a latching relay coil, a latching relay 1202 is turned on such that a contact point 1204 and a contact point 1206 come into contact with each other. Even after the contact points of the first terminal 1109 and the second terminal 1108 become separated from each other by releasing the knob of the standby power cut-off switch 1100, the power is continuously supplied to the power unit 601 and thus the electronic product performs a normal operation.

If the knob of the standby power cut-off switch 1100 is pressed to power off the electronic product, the third terminal 1106 and the fourth terminal 1105 of the standby power cut-off switch 1100 come into contact with each other. A terminal IRQ of a Micom U2 goes high, and the Micom U2 generates an output O3 of a high level for a predetermined time to turn on transistors Q3 and Q4. If current flows from s to r through a latching relay coil to turn off the latching relay 1202, the contact point 1204 and the contact point 1206 become separated from each other. Thus, the AC power supplied to the power unit 601 is cut off, thereby powering off the electronic product.

Figure 13:
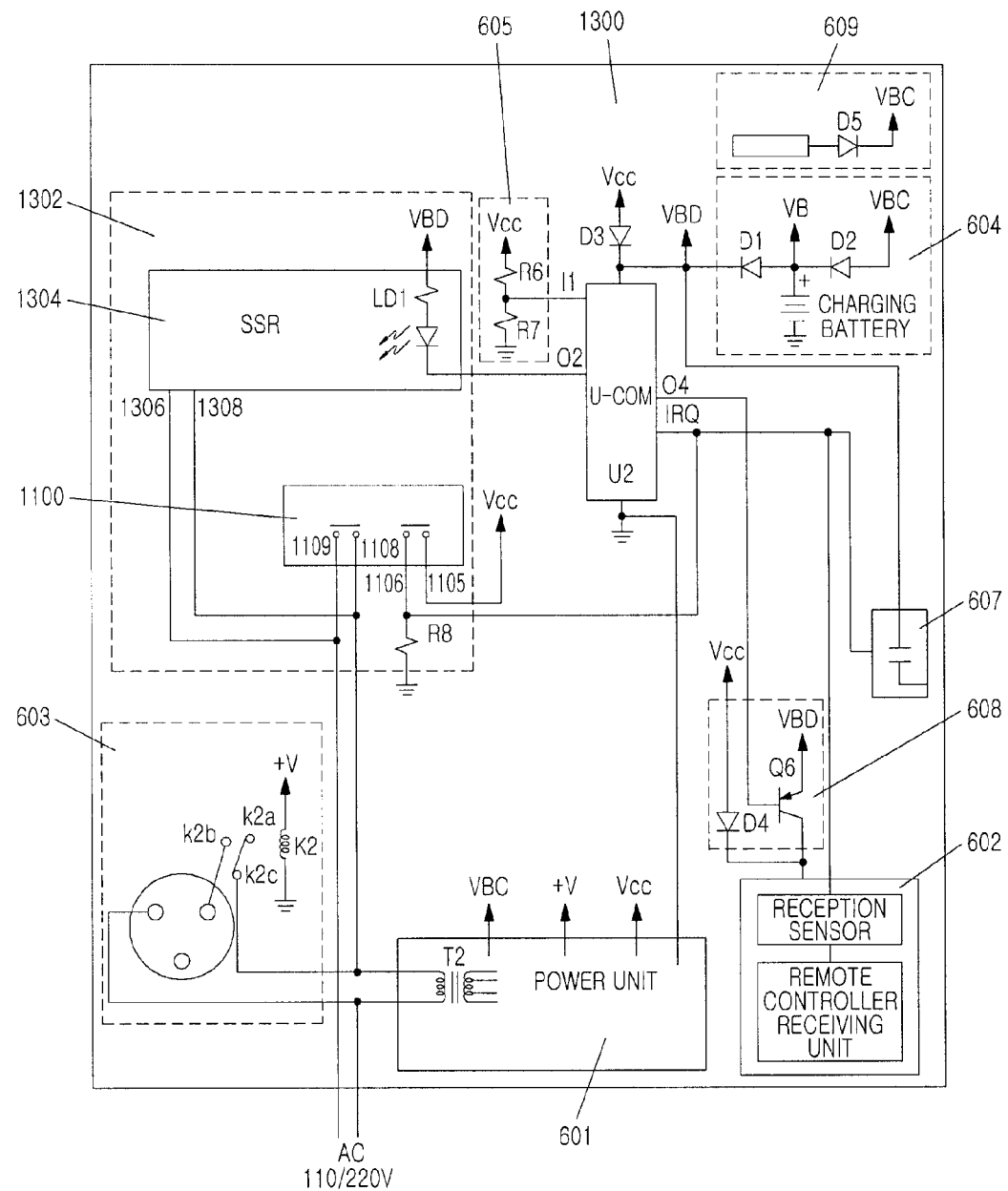
FIG. 13 is a circuit diagram of an electronic product to which a standby power cut-off device is applied according to still another embodiment of the present invention.

FIG. 13 is a circuit diagram of an electronic product (1300) to which a standby power cut-off device is applied according to still another embodiment of the present invention. Referring to FIG. 13, once the knob of the standby power cut-off switch 1100 is pressed, the contact points of the terminals 1108 and 1109 come into contact with each other, such that power is supplied to the power unit 601. The power unit 601 transforms the AC power to DC power to supply power necessary for the electronic product. The Micom U2 generates the output O2 of a low level to allow current to flow in a photo light emitting diode (LED) LD1 of a non-contact point relay 1304, such that input terminals 1306 and 1308 of the non-contact point relay 1304 are turned on. Accordingly, even after the contact points of the first terminal 1109 and the second terminal 1108 become separated from each other by the release of the knob of the standby power cut-off switch 1100, power is continuously supplied and the electronic product performs a normal operation.

If the knob of the standby power cut-off switch 1100 is pressed to power off the electronic product, the third terminal 1106 and the fourth terminal 1105 of the standby power cut-off switch 1100 come into contact with each other. The terminal IRQ of the Micom U2 goes high, and the Micom U2 generates the output O2 of a high level such that current to the photo LED LD1 of the non-contact point relay 1304 is blocked. Thus, if the input terminals 1306 and 1308 of the non-contact point relay 1304 are turned off, the AC power supplied to the power unit 601 is cut off.

Figure 14:
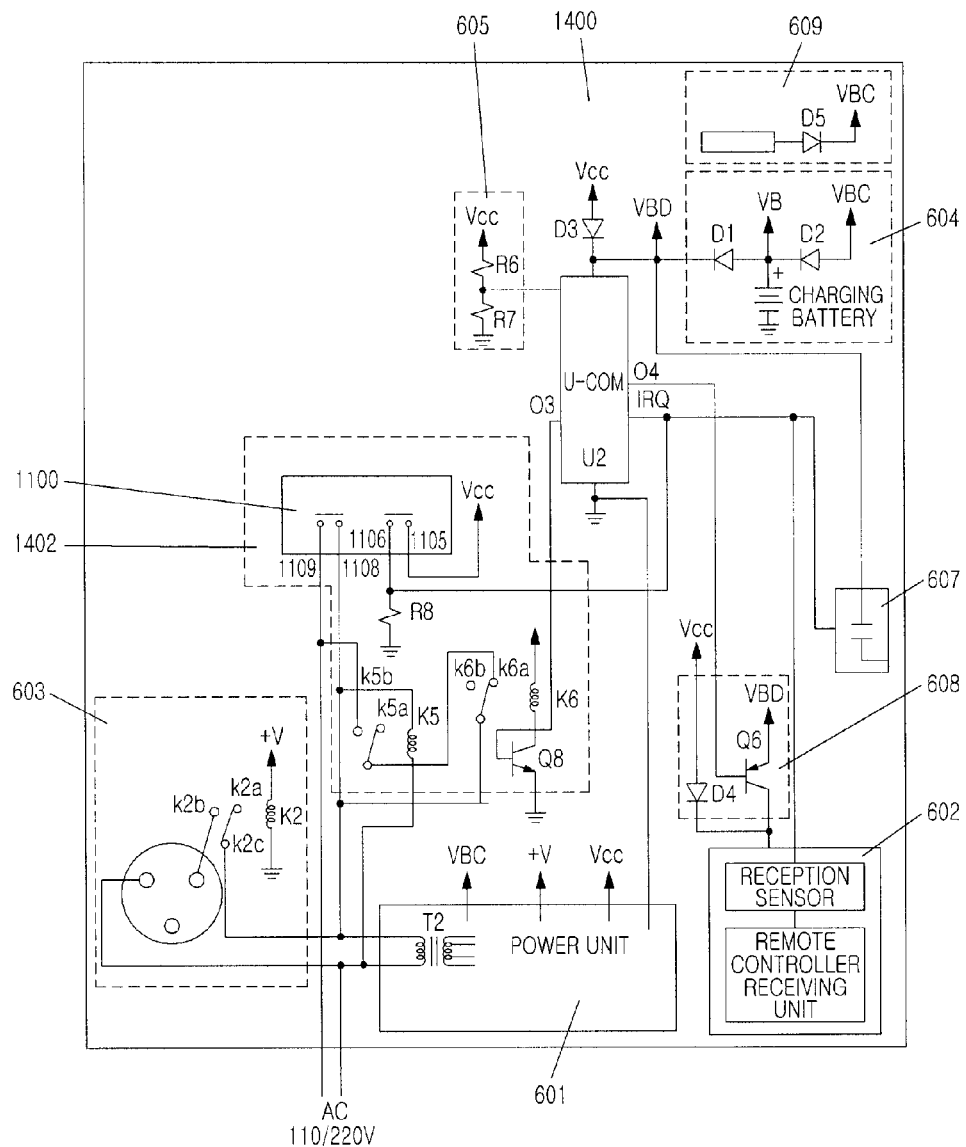
FIG. 14 is a circuit diagram of an electronic product to which a standby power cut-off device is applied according to yet another embodiment of the present invention.

FIG. 14 is a circuit diagram of an electronic product (1400) to which a standby power cut-off device is applied according to yet another embodiment of the present invention. Referring to FIG. 14, once the knob of the standby power cut-off switch 1100 is pressed, the contact points of the terminals 1108 and 1109 come into contact with each other, such that current flows through a coil of a relay K5. When the current flows through the coil of the relay K5, a switch moves from a contact point k5a to k5b and AC power is supplied to the power unit 601 through a terminal k6a of a relay K6. The power unit 601 transforms the AC power to DC power to supply power necessary for the electronic product. If the knob of the standby power cut-off switch 1100 is released, the power is continuously supplied to the electronic product even if the terminals 1108 and 1109 of the standby power cut-off switch 1100 become separated from each other, so that the electronic product performs a normal operation.

If the knob of the standby power cut-off switch 1100 is pressed later to power off the electronic product, the third terminal 1106 and the fourth terminal 1105 of the standby power cut-off switch 1100 come into contact with each other. The terminal IRQ of the Micom U2 goes high, and the Micom U2 generates the output O3 of a high level such a transistor Q8 is turned on. Once the transistor Q8 is turned on, the contact point of the relay K6 is connected to a terminal k6b from a terminal k6a. Thus, the AC power supplied from an external source to the power unit 601 is cut off.

FIGS. 15A through 15D are diagrams illustrating a standby power cut-off switch according to still another embodiment of the present invention. A standby power cut-off switch 1500 includes a first striker spring 1530, a tack knob 1502, a knob 1503, a first striker 1531, a second striker 1532, a second striker 1533, a first contact point 1507, a second contact point 1508, a third contact point 1521, a fourth contact point 1522, a solenoid terminal 1509, a solenoid 1536, a solenoid coil 1537, a bobbin 1535, a removable plate 1534, a knob spring 1513, a leaf spring 1514, a first tack switch contact point 1515, and a second tack switch contact point 1516. Hereinafter, operations of the standby power cut-off switch 1500 will be described in brief.

Figure 15A:
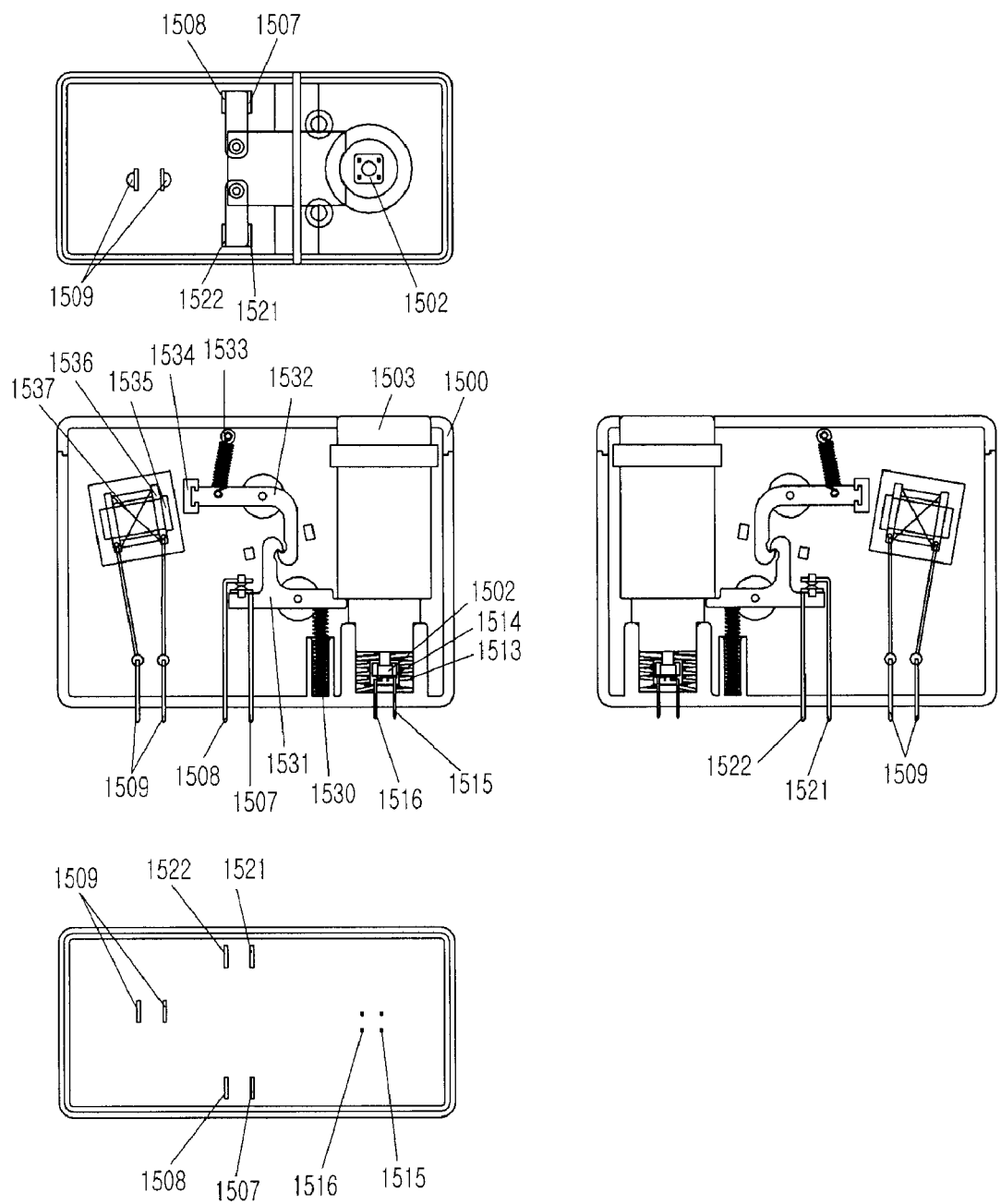
FIGS. 15A through 15D are diagrams illustrating a standby power cut-off switch according to still another embodiment of the present invention.
Figure 15B:
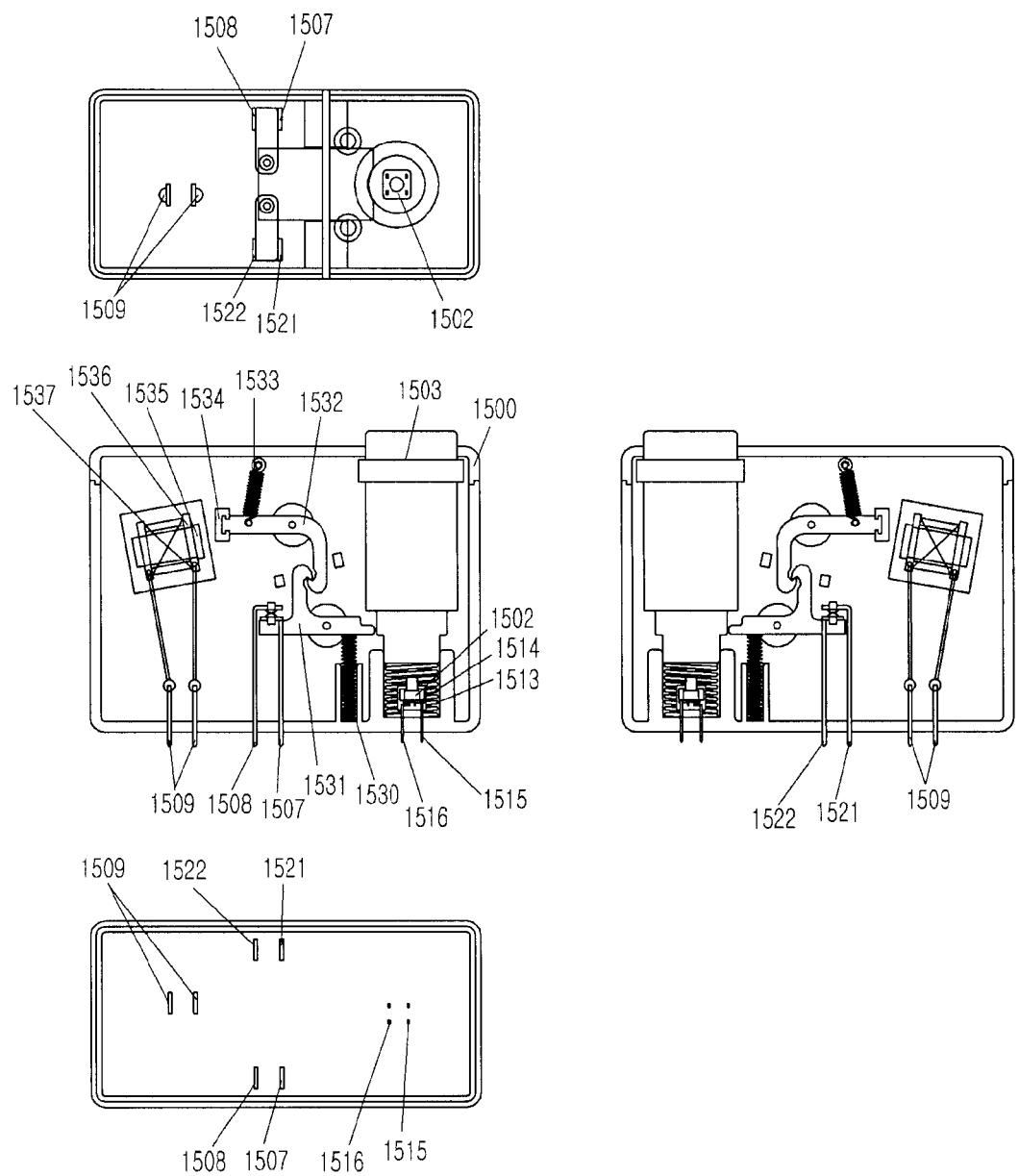

Referring to FIG. 15A, if the knob 1503 is pressed to power off an electronic product, a hook portion of the first striker 1531 and a hook portion of the second striker 1532 are engaged with each other, such that the first contact point 1507 and the second contact point 1508 come into contact with each other and the third contact point 1521 and the fourth contact point 1522 come into contact with each other. At the same time, the tack knob 1502 is pressed, and the first tack switch contact point 1515 and the second tack switch contact point 1516 come into contact with each other. Even if the knob is released later, those contact points are in contact with each other by the first striker spring 1530. FIG. 15B shows a state of the standby power cut-off switch 1500 in which the knob is released after being pressed. Once the first contact point 1507 and the second contact point 1508 come into contact with each other and the third contact point 1521 and the fourth contact point 1522 come into contact with each other, power is supplied to the electronic product as described above.

Figure 15C:
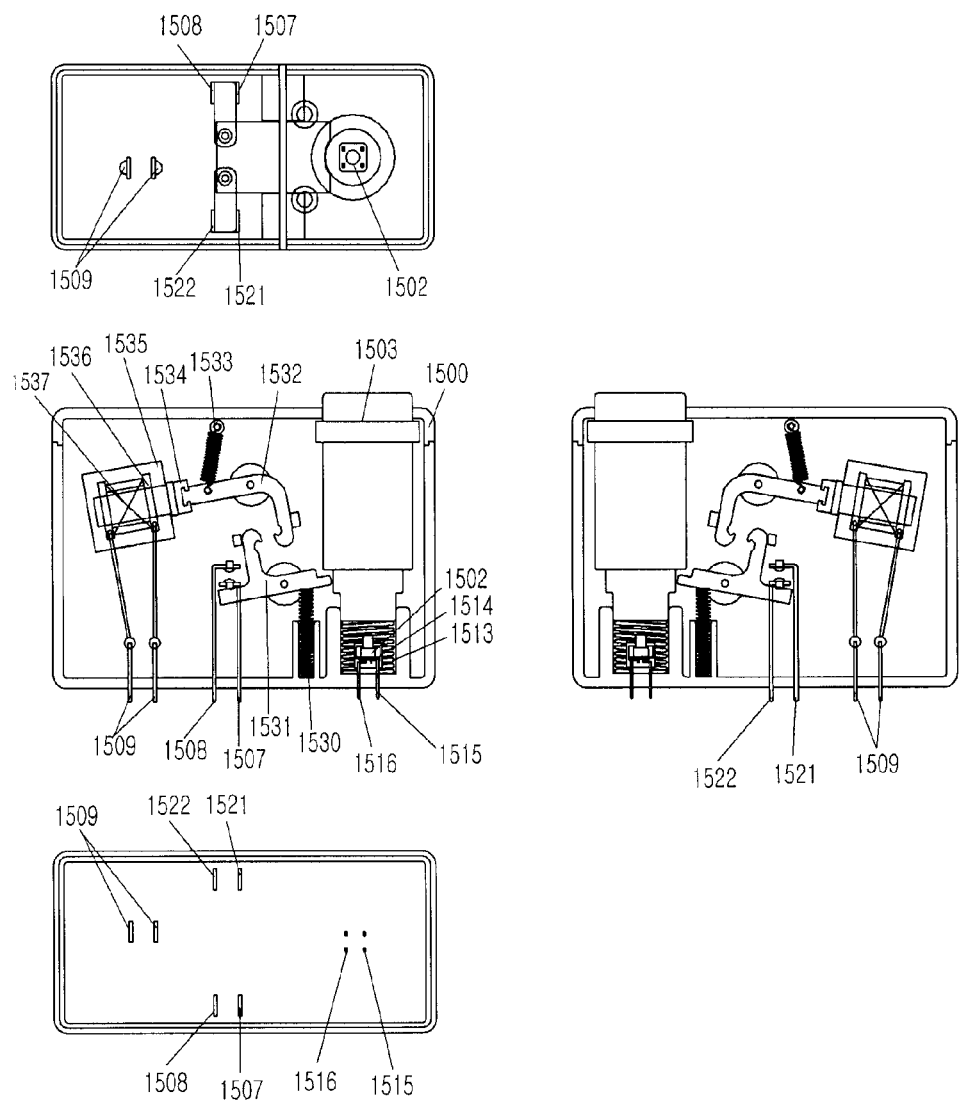
Figure 15D:
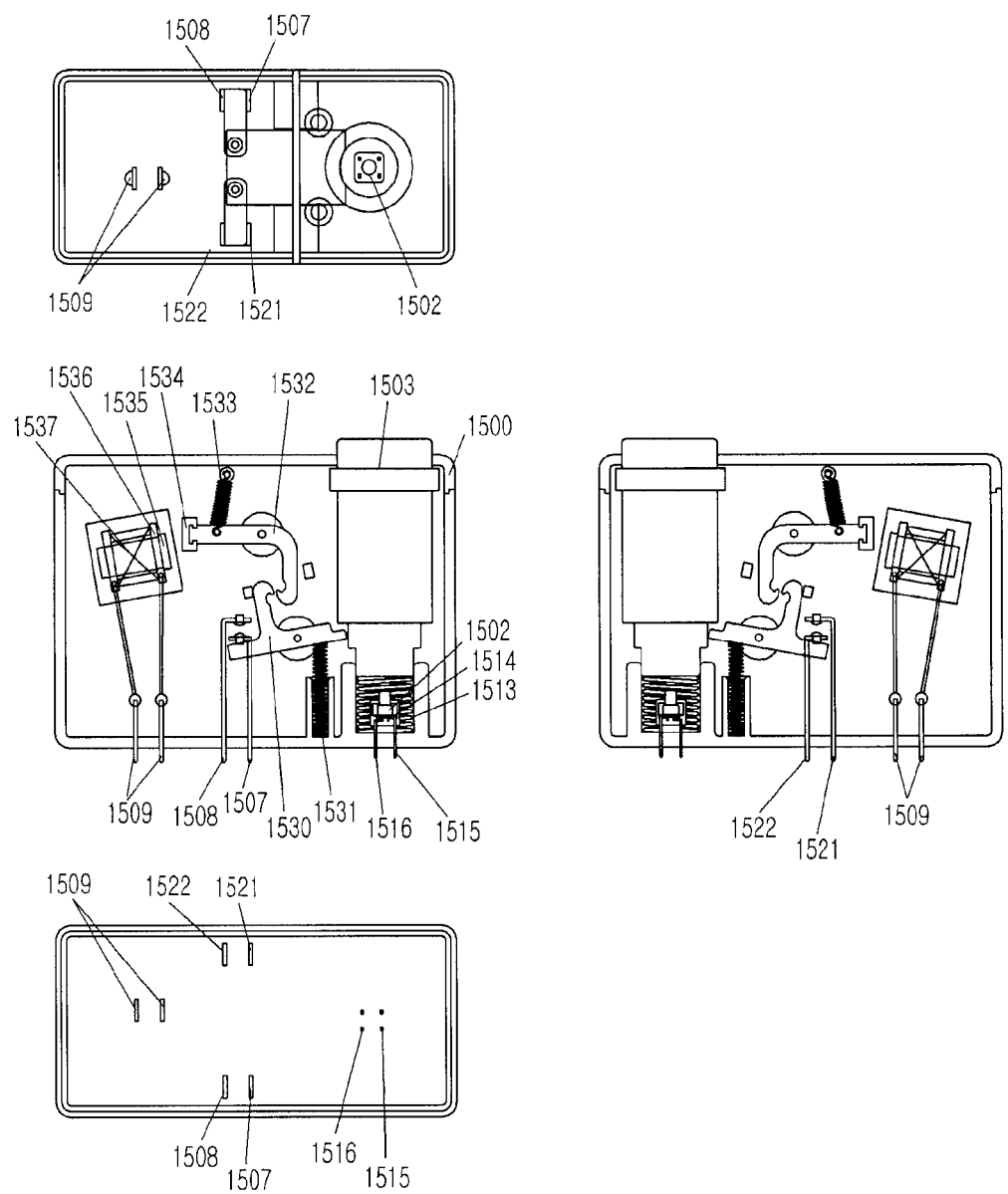

Referring to FIGS. 15C and 15D, if the knob 1503 is released after being pressed to power off the electronic product, the first tack switch contact point 1515 and the second tack switch contact point 1516 in contact with each other become separated from each other. A power-off signal is generated by contact/separation between the tack switch contact points 1515 and 1516. The power-off signal is provided to a controller which supplies current for operating the solenoid 1536. Once the current is supplied to the solenoid 1536, the solenoid 1536 functions as an electromagnet which attracts the removable plate 1534. As a result, the hook portion of the first striker 1531 and the hook portion of the second striker 1532 come disengaged from each other, such that the first contact point 1507 and the second contact point 1508 become separated from each other and the third contact point 1521 and the fourth contact point 1522 become separated from each other. As a result, power to the electronic product is cut off as described above, thereby cutting off standby power.

As is apparent from the foregoing description, a standby power cut-off device can be implemented in various ways. By using the standby power cut-off device according to various embodiments of the present invention, the standby power of the electronic product can be automatically cut off merely by turning off the power switch without unplugging the electronic product.

The foregoing standby power cut-off devices commonly includes a first switch portion for making a contact point and another contact point of a power cable input from an outside contact or be separated from each other, a second switch portion for providing a power-on or power-off signal to a controller according to power-on or power-off of a switch of an electronic product, and the controller for controlling the first switch portion. The first switch portion is related to a knob and a relay switch, and the second switch portion is related to a tack knob which operates in association with an operation of the knob switch. The standby power cut-off devices may include a drive portion for driving the first switch portion, and the drive portion is controlled by the controller.

In the present invention operating as described above in detail, the effects achieved by representatives of the disclosed invention will be briefly described below.

By providing an electronic product to which a standby power cut-off device and a control method for the same are applied, the standby power of the electronic product can be cut off by using an existing general outlet, without a need to use an outlet having a separate function added thereto. The present invention also can automatically cut off standby power by turning on or turning off a power switch without unplugging the electronic product. Therefore, a user can easily cut off the standby power and thus reduce energy consumption caused by the standby power.

Meanwhile, while the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

That is, in the detailed description of the present invention provided above, implementation examples for efficiently cutting off standby power in an electronic product have been described. However, the present invention is also applicable to similar technical backgrounds and industrial equipments without departing from the scope of the present invention, and such applications can be made according to determination of those of ordinary skill in the art.

What is claimed is:

1. A standby power cut-off device, comprising:
   a striker that is movable toward a side as a knob switch for powering on or off an electronic product is pressed;
   a striker contact fixed at a side of the striker to cause a contact point and another contact point of a power cable going to a power supply device of the electronic product to contact or be separated from each other;
   a core spaced apart from the striker by a predetermined interval, the core comprising a magnet for maintaining contact between the contact point and the another contact point by attracting the striker, which moves toward the side upon pressing of the knob switch, by a magnetic force thereof; and
   a solenoid for cause the contact point and the another contact point to contact or be separated from each other by generating a repulsive force with respect to the magnetic force if the electronic product is powered off.

2. The standby power cut-off device of claim 1, further comprising:
   a tack knob engaged with the knob switch for delivering a predetermined control signal to cut off standby power; and
   a leaf spring for connecting two tack switch contact points by the tack knob.

3. The standby power cut-off device of claim 2, further comprising:
   a controller for receiving an electric signal generated by contact between two tack switch contact points through the tack knob and then outputting a control signal for powering off the electronic product, if the electronic product is powered off by using a knob switch; and
   a current determining drive stage for supplying current to the solenoid by using the control signal input from the controller.

4. The standby power cut-off device of claim 1, wherein the solenoid comprises:
   a bobbin;
   a solenoid coil wound around the bobbin; and
   a solenoid coil terminal to which control current for powering off the electronic product is input.

5. The standby power cut-off device of claim 4, further comprising:
   a striker spring for moving the striker, which has moved towards the side, towards an original position thereof; and
   a knob spring for restoring the knob switch to an original position thereof after the knob switch is pressed.

6. The standby power cut-off device of claim 1, further comprising:
   a standby current determiner for determining that the electronic product is powered off by measuring standby current if the electronic product is powered off by using software; and
   a current determining drive stage for supplying current to the solenoid by using a value output from the standby current determiner.

7. The standby power cut-off device of claim 1, further comprising a controller for causing the one contact point and the another contact point to be separated from each other by supplying current to the solenoid upon input of a power-off signal from a remote control receiver if the electronic product is powered off by using a remote controller, and for causing the one contact point and the another contact point to contact each other by supplying reverse current to the solenoid upon input of a power-on signal from the remote control receiver if the electronic product is powered on by using the remote controller.

8. The standby power cut-off device of claim 7, further comprising a charging power supplier for supplying temporary power to the remote control receiver to receive a signal from the remote controller when the electronic product is in a power-off state.

9. The standby power cut-off device of claim 8, wherein the controller controls the charging power supplier to supply power to the remote control receiver at predetermined time intervals to extend the life span of the charging power supplier.

10. The standby power cut-off device of claim 1, further comprising a controller for causing the one contact point and the another contact point to be separated from each other by supplying the current to the solenoid upon input of a power-off signal from a touch switch if the electronic product is powered off by using the touch switch, and for causing the one contact point and the another contact point to contact each other by supplying reverse current to the solenoid upon input of a power-on signal from the touch switch if the electronic product is powered on by using the touch switch.

11. The standby power cut-off device of claim 1, further comprising a power failure cut-off device for providing the solenoid with control current for causing the one contact point and the another contact point to contact or be separated from each other to cut off standby power in case of a power failure.

12. The standby power cut-off device of claim 1, wherein the standby power cut-off device is installed in an electronic product.

13. An electronic product comprising the standby power cut-off device of claim 1, the electronic product comprising an outlet portion for automatically controlling power of peripheral devices by controlling main power of the electronic product.

14. The electronic product of claim 13, wherein the outlet portion comprises a relay switch which is automatically controlled according to on or off of the main power.

15. A standby power cut-off method for an electronic product driven by software, the standby power cut-off method comprising:
   receiving a power-off signal by using the software;
   determining whether data storing has been finished prior to power-off of the electronic product;
   determining a contact point of a tack switch for controlling the power is in an open state if the data storing has been finished; and
   supplying current to a solenoid to cause a contact point and another contact point of a power cable going to a power supply device for supplying the standby power to contact or be separated from each other, if the tack switch is in the open state.

16. A standby power cut-off method for an electronic product driven by a remote controller, the standby power cut-off method comprising:
   receiving a power-off signal by using the remote controller;
   determining a power-off mode as a standby mode or a standby power cut-off mode according to an input scheme using the remote controller;
   determining whether a contact point of a tack switch for controlling power of the electronic product is in an open state if the mode is determined as the standby cut-off mode; and supplying current to a solenoid to cause a contact point and another contact point of a power cable going to a power supply device for supplying the standby power to contact or be separated from each other, if the contact point of the tack switch is in the open state.

17. The standby power cut-off method of claim 16, wherein the input scheme using the remote controller is identified according to whether a power button of the remote controller is pressed for a predetermined time or more.

18. A standby power cut-off device comprising:
a knob switch for powering on or off an electronic product;
a first switch portion for causing a contact point and another contact point of a power cable going to a power supply device of the electronic product to contact or be separated from each other according to an operation of the knob switch;
a second switch portion for generating a power-on signal or a power-off signal for the electronic product according to the operation of the knob switch; and
a controller for automatically cutting off standby power consumed in the electronic product by controlling an operation of the first switch portion, upon input of the power-on signal or the power-off signal from the second switch portion.

19. The standby power cut-off device of claim 18, further comprising a first switching drive portion for supplying current for operating the first switch portion upon input of a control signal from the controller.

20. The standby power cut-off device of claim 18, wherein the first switch portion is driven by a latching relay or a non-contact point relay.

21. The standby power cut-off device of claim 18, wherein a power-on signal or a power-off signal input to the controller is generated from a remote controller or a touch switch.

* * * * *